United States Patent [19]
Winter et al.

[11] Patent Number: 6,039,082
[45] Date of Patent: *Mar. 21, 2000

[54] FLEXIBLE HOSE CONSTRUCTION AND METHOD OF MAKING THE SAME

[75] Inventors: Jeffrey J. Winter, Ocala, Fla.; Homer N. Holden, Sylva, N.C.; James L. Lawrence, Ocala, Fla.

[73] Assignee: Dayco Products, Inc., Dayton, Ohio

[ * ] Notice: This patent is subject to a terminal disclaimer.

[21] Appl. No.: 09/305,992

[22] Filed: May 6, 1999

Related U.S. Application Data

[62] Division of application No. 09/087,317, May 29, 1998, which is a division of application No. 08/551,388, Nov. 1, 1995, abandoned, which is a division of application No. 08/326,631, Oct. 20, 1994, abandoned, which is a division of application No. 08/149,584, Nov. 9, 1993, Pat. No. 5,394,904, which is a division of application No. 07/869,696, Apr. 16, 1992, Pat. No. 5,279,332, which is a division of application No. 07/575,731, Aug. 31, 1990, Pat. No. 5,129,428, which is a continuation-in-part of application No. 07/405,487, Sep. 11, 1989, Pat. No. 5,089,074.

[51] Int. Cl.⁷ ................................................. F16L 11/08
[52] U.S. Cl. ........................ 138/121; 138/122; 138/137; 138/173
[58] Field of Search .................... 138/121, 122, 138/173, 154, 129, 130

[56] References Cited

U.S. PATENT DOCUMENTS

| | | | |
|---|---|---|---|
| 4,098,298 | 7/1978 | Vohrer | 138/122 |
| 4,620,569 | 11/1986 | Von Glanstatten et al. | 138/121 X |
| 4,966,202 | 10/1990 | Bryan et al. | 138/173 X |
| 5,058,934 | 10/1991 | Brannon | 138/121 X |
| 5,129,482 | 7/1992 | Winter et al. | 138/121 X |
| 5,145,545 | 9/1992 | Winter et al. | 138/121 X |
| 5,279,332 | 1/1994 | Winter et al. | 138/121 X |
| 5,358,358 | 10/1994 | Tassone et al. | 138/173 X |
| 5,485,870 | 1/1996 | Kraik | 138/121 X |

*Primary Examiner*—Patrick Brinson
*Attorney, Agent, or Firm*—Joseph V. Tassone

[57] ABSTRACT

A flexible hose construction and method of making the same are provided, the flexible hose construction comprising an inner tube made of polymeric material, an outer sleeve of reinforcing material disposed in telescoping relation on the inner tube from one end thereof to the other end thereof, rib structure disposed between the sleeve of reinforcing material and the inner tube, the rib structure being disposed on the inner tube so as to define alternating coil structure of rib structure and coil structure of non-rib structure serially along the longitudinal axis of the inner tube in a like repeating pattern thereof, the coil structure of non-rib structure comprise coil structure of void space, and an outer tube of polymeric material disposed between the rib structure and the sleeve of reinforcing material so as to extend in a generally straight-line manner from coil structure of the rib structure to coil structure of the rib structure so as to tend to prevent the sleeve of reinforcing material from entering into the coil structure of void space an amount that would tend to substantially reduce the flexibility characteristics of the hose construction.

5 Claims, 15 Drawing Sheets

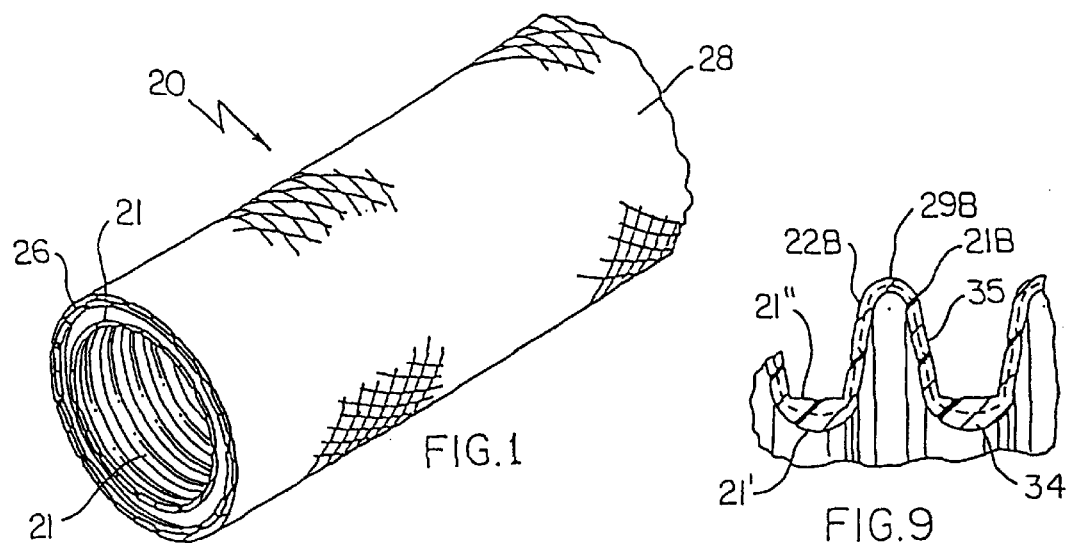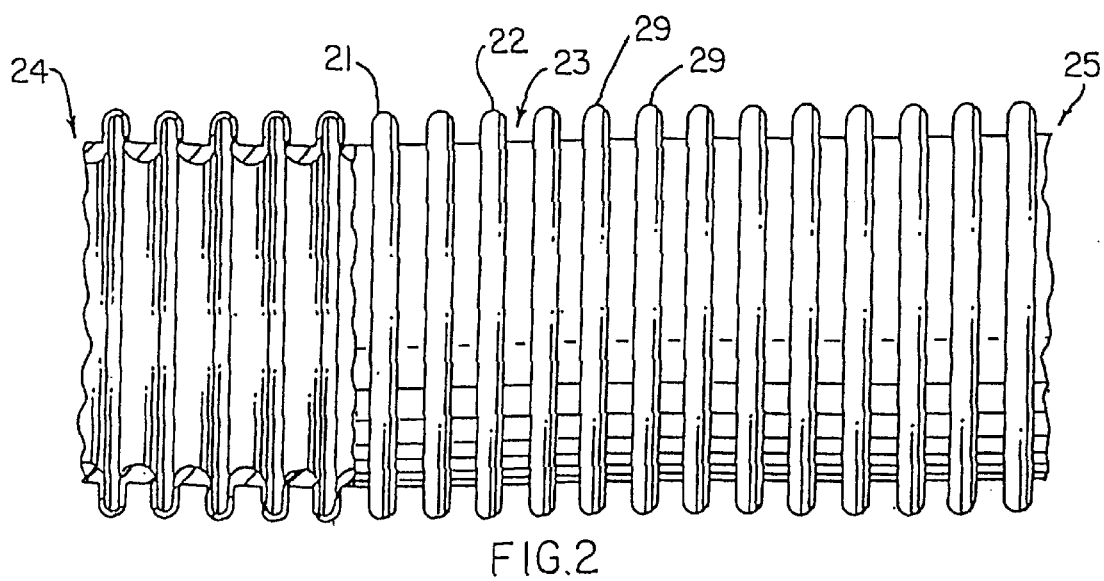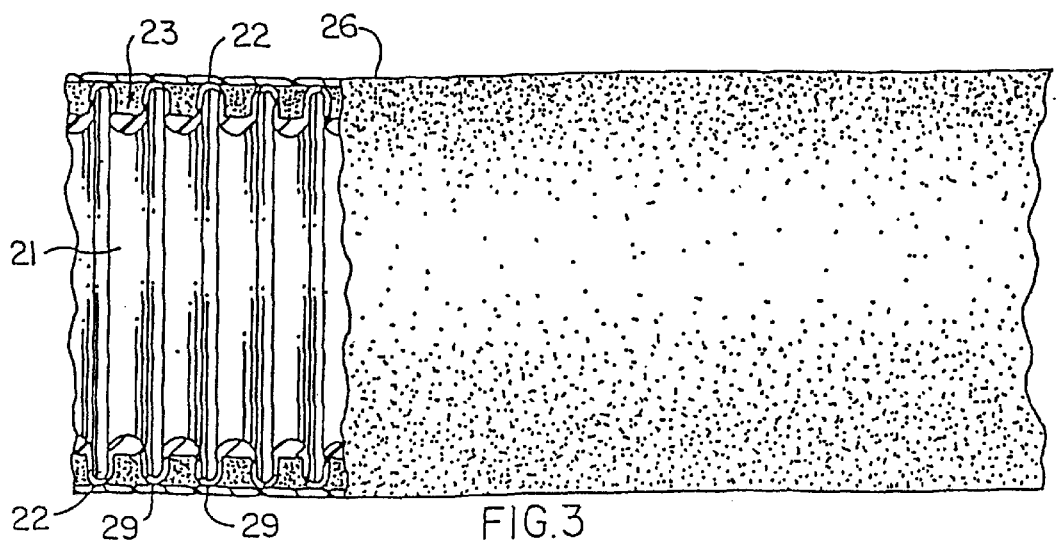

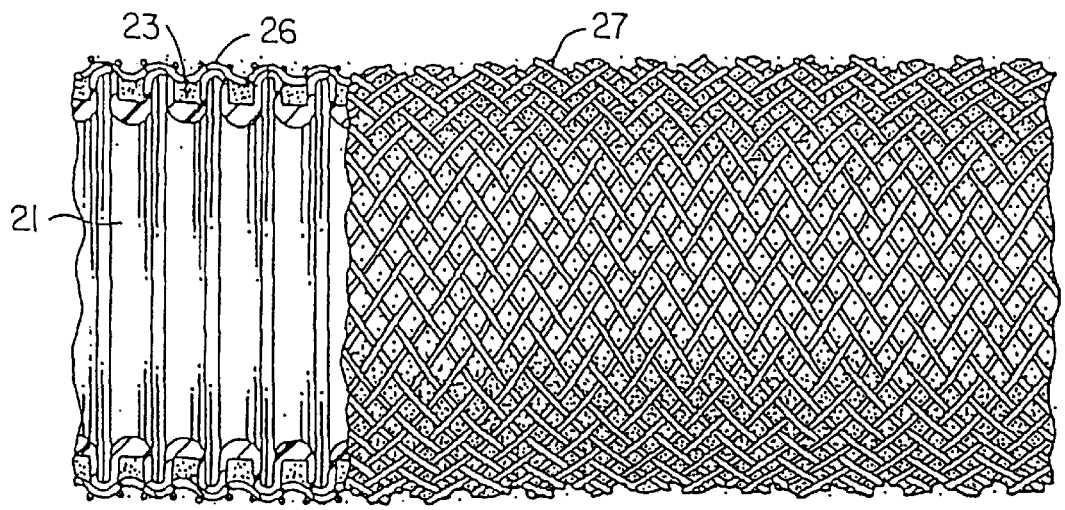
FIG.4
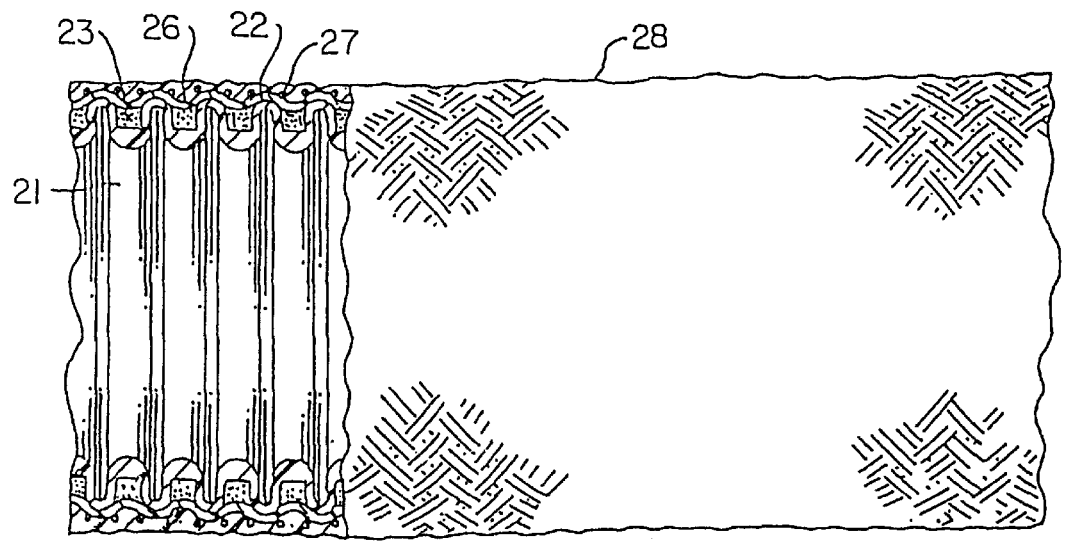
FIG.5
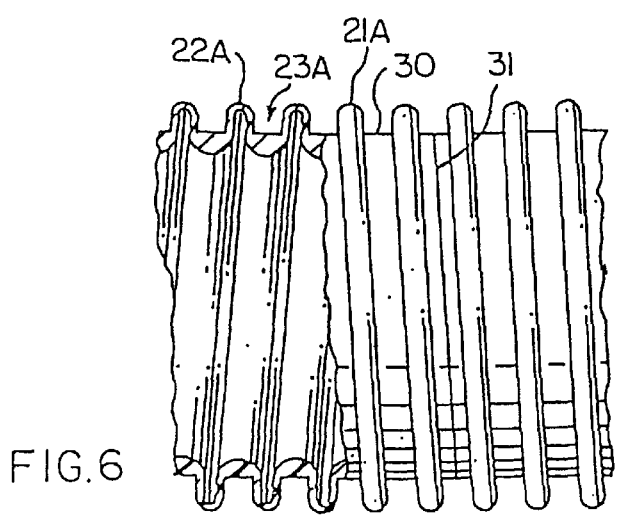
FIG.6
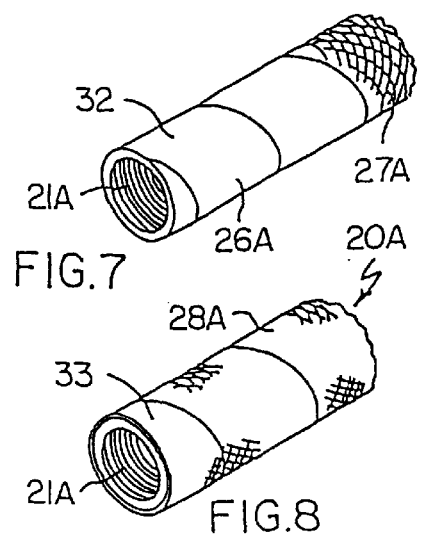
FIG.7
FIG.8

FLEXIBLE HOSE CONSTRUCTION AND METHOD OF MAKING THE SAME

CROSS REFERENCE TO RELATED APPLICATIONS

This application is a is a divisional patent application of its copending parent application Ser. No. 09/087,317, filed May 29, 1998; which in turn, is a divisional patent application of its parent application, Ser. No. 08/551,388, filed Nov. 1, 1995 (now abandoned); which in turn, is a divisional application of Ser. No. 326,631, filed Oct. 20, 1994 (now abandoned); which in turn is a divisional application of its parent patent application Ser. No. 149,584, filed Nov. 9, 1993, now U.S. Pat. No. 5,394,904; which in turn, is a divisional patent application of its parent patent application, Ser. No. 869,696, filed Apr. 16, 1992, now U.S. Pat. No. 5,279,332; which in turn, is a divisional patent application of its copending parent patent application Ser. No. 575,731, filed Aug. 31, 1990, now U.S. Pat. No. 5,129,428; which in turn continuation-in-part patent application of its copending parent patent application, Ser. No. 405,487, filed Sep. 11, 1989, now U.S. Pat. No. 5,089,074.

BACKGROUND OF THE INVENTION

1. Field of the Invention

This invention relates to a new flexible hose construction and to a new method of making such a flexible hose construction.

2. Prior Art Statement

It is known to provide a flexible hose construction comprising an inner corrugated hose made of polymeric material and having a plurality of outwardly convex projections with recesses therebetween and extending from one end thereof to the other end thereof, and an outer sleeve of reinforcing material disposed in telescoping relation on the inner hose. For example, see the U.S. Pat. No. 4,415,389 to Medford et al.

It is also known to dispose a tube of polymeric material inside a corrugated hose and have its outer peripheral surface engaging the inwardly facing convex projections thereof in a generally straight-line manner from one end of the corrugated hose to the other end thereof. For example, see the U.S. Pat. No. 4,312,383 to Kleykamp.

It is also known to provide a flexible hose construction comprising an inner tube made of polymeric material, an outer sleeve of reinforcing material disposed in telescoping relation on the inner tube from one end thereof, rib disposed between the sleeve of reinforcing material and the inner tube, the rib being disposed on the inner tube so as to define alternating coil of rib and coil of non-rib serially along the longitudinal axis of the inner tube in a like repeating pattern thereof. For example, see the U.S. Pat. No. 4,706,712 to Oglesby et al.

SUMMARY OF THE INVENTION

It is one feature of this invention to provide a new flexible hose construction wherein the flexibility characteristics of an inner corrugated hose thereof are not substantially diminished by having an outer sleeve of reinforcing material extend into the outwardly facing recesses defined by the corrugations of the inner hose an amount that would diminish such flexibility characteristics.

In particular, it was found according to the teachings of this invention that a tube of polymeric material can be disposed between the sleeve of reinforcing material and the inner hose and have its inner peripheral surface engaging the outwardly facing convex projections from the one end to the other end of the inner hose so as to tend to prevent the sleeve of reinforcing material from entering into the outwardly facing recesses of the inner hose an amount that would tend to substantially reduce the flexibility characteristics of the corrugated inner hose.

In this manner, it was found according to the teachings of this invention, that the inner corrugated hose could be formed of a thermoplastic material that readily permits the flexible hose construction to be utilized for conveying a volatile liquid therethrough, such as gasoline for transportation vehicles and the like, and still permit the hose construction to be sufficiently flexible and lightweight so that the same can be readily bent into the desired shape thereof for its intended conveying purpose.

For example, one embodiment of this invention provides a flexible hose construction comprising an inner corrugated hose made of polymeric material and having a plurality of outwardly convex projections with recesses therebetween and extending from one end thereof to the other end thereof, an outer sleeve of reinforcing material disposed in telescoping relation on the inner hose, and a tube of polymeric material disposed between the sleeve of reinforcing material and the inner hose and extending in a generally straight-line manner from projection to projection of the inner hose so as to tend to prevent the sleeve of reinforcing material from entering into the recesses of the inner hose an amount that would tend to substantially reduce the flexibility characteristics of the inner hose.

However, it is believed according to the teachings of this invention that a second tube of polymeric material can be disposed inside the inner hose and have its outer peripheral surface engaging the inwardly facing convex projections of the inner hose in a generally straight-line manner from the one end of the inner hose to the other end thereof.

In this manner, it is believed that the second tube could be formed of a thermoplastic material that readily permits the flexible hose construction to be utilized for conveying a volatile liquid therethrough, such as gasoline for transportation vehicles and the like, and still permit the hose construction to be sufficiently flexible and lightweight so that the same can be readily bent into the desired shape thereof for its intended conveying purpose.

For example, another embodiment of this invention provides a flexible hose construction comprising an inner corrugated hose made of polymeric material and having a plurality of outwardly facing convex projections with outwardly facing recesses therebetween and extending from one one end thereof to the other end thereof, the inner hose having a plurality of inwardly facing convex projections with inwardly facing recesses therebetween and extending from the one end thereof to the other end thereof, an outer sleeve of reinforcing material disposed in telescoping relation on the inner hose, a first tube of polymeric material disposed between the sleeve of reinforcing material and the inner hose and having an inner peripheral surface engaging the outwardly facing convex projections in a generally straight-line manner from the one end thereof to the other end thereof so as to tend to prevent the sleeve of reinforcing material from entering into the outwardly facing recesses of the inner hose an amount that would tend to substantially reduce the flexibility characteristics of the inner hose, and a second tube of polymeric material disposed inside the inner hose and having an outer peripheral surface engaging the inwardly facing convex projections in a generally straight-line manner from the one end thereof to the other end thereof.

However, it is believed according to the teachings of this invention that the inner corrugated hose of each hose construction of this invention can be replaced with a rib and an inner tube of polymeric material and with the rib being disposed on the inner tube in such a manner that the rib defines alternating coil of rib and coil of non-rib serially along the longitudinal axis of the inner tube in a like repeating pattern thereof.

In this manner, the other or outer tube of polymeric material can still be disposed between the rib and the sleeve of reinforcing material so as to tend to prevent the sleeve of reinforcing material from entering into the void space between the coils of rib an amount that would tend to substantially reduce the flexibility characteristics of the hose construction.

For example, another embodiment of this invention provides a flexible hose construction comprising an inner tube made of polymeric material, an outer sleeve of reinforcing material disposed in telescoping relation on the inner tube from one end thereof to the other end thereof, rib disposed between the sleeve of reinforcing material and the inner tube, the rib being disposed on the inner tube so as to define alternating means coil of rib and coil of non-rib serially along the longitudinal axis of the inner tube in a like repeating pattern thereof, the coil of non-rib comprising coil of void space and an outer tube of polymeric material disposed between the rib and the sleeve of reinforcing material so as to extend in a generally straight-line manner from coil of the rib to coil of the rib so as to tend to prevent the sleeve of reinforcing material from entering into the coil of void space an amount that would tend to substantially reduce the flexibility characteristics of the hose construction. In such an arrangement, the ribs are disposed between the inner tube and the outer tube, and can be bonded to either one, and the ribs may be annular and longitudinally spaced along the tubes. It is also contemplated to wind a strip of polymeric material in a helical manner to comprise the rib. A continuous path may also be formed between the rib and the outer tube to permit fluids to flow in this passage.

Accordingly, it is an object of this invention to provide a new flexible hose construction having one or more of the novel features of this invention as set forth above or hereinafter shown or described.

Another object of this invention is to provide a new method of making such a flexible hose construction, the method of this invention having one or more of the novel features of this invention as set forth above or hereinafter shown or described.

Other objects, uses and advantages of this invention are apparent from a reading of this description which proceeds with references to the accompanying drawings forming a part thereof and wherein:

BRIEF DESCRIPTION OF THE DRAWINGS

FIG. 1 is a fragmentary perspective view, partially in cross section, and illustrating the new flexible hose construction of this invention.

FIG. 2 is an enlarged fragmentary side view, partially in cross section, and illustrating the inner corrugated hose of the hose construction of FIG. 1.

FIG. 3 is a view similar to FIG. 1 and illustrates the inner corrugated hose of FIG. 2 having a unique tube of polymeric material disposed thereon according to the method of this invention.

FIG. 4 is a view similar to FIG. 3 and illustrates how a sleeve of reinforcing material is disposed on top of the tube of polymeric material that has been placed on the inner corrugated hose as illustrated in FIG. 3.

FIG. 5 is a view similar to FIG. 4 and illustrates how an outer polymeric layer is disposed over the reinforcing sleeve of FIG. 4 to complete the hose construction that is illustrated in FIG. 1.

FIG. 6 is a fragmentary view similar to FIG. 1 and illustrates another embodiment of the inner corrugated hose.

FIG. 7 is a fragmentary perspective view similar to FIG. 1 and illustrates how a tube of polymeric material and a reinforcing sleeve can be disposed in series on the corrugated hose of FIG. 6.

FIG. 8 is a view similar to FIG. 7 and illustrates a completed hose construction of this invention made from the structure of FIG. 7 by having an outer polymeric layer disposed over the reinforcing layer of the structure of FIG. 7.

FIG. 9 is an enlarged fragmentary cross-sectional view of another inner hose of this invention for the hose constructions of this invention.

DESCRIPTION OF THE PREFERRED EMBODIMENTS

Figure 10:
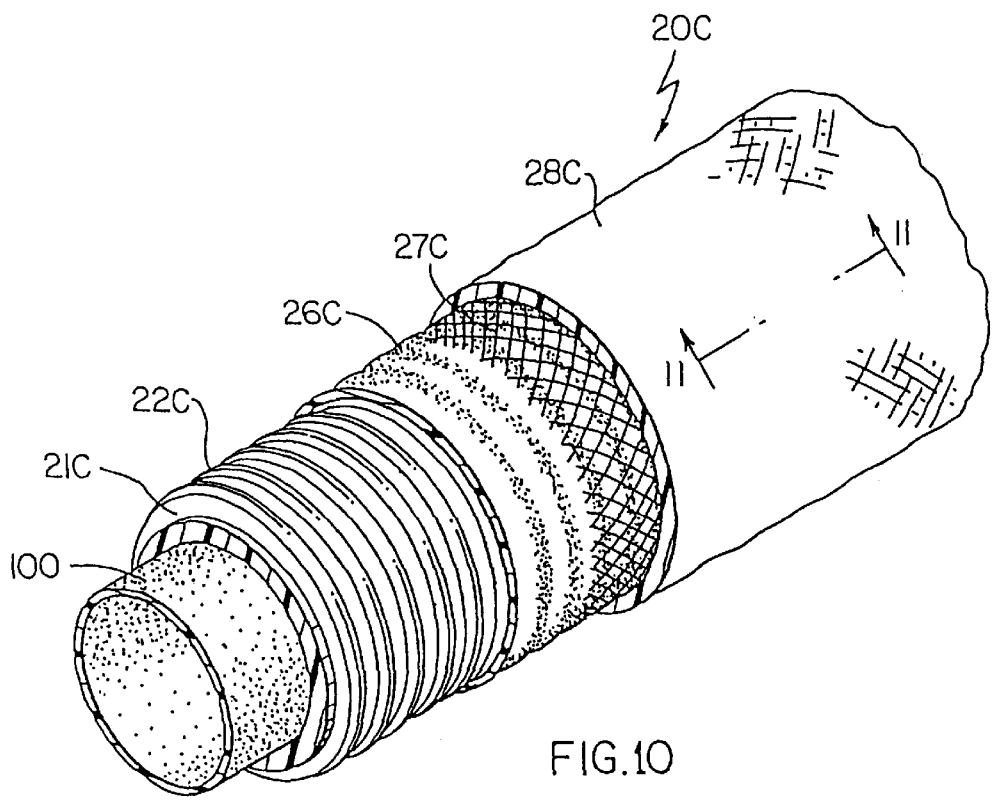
FIG. 10 is a view similar to FIG. 1 and illustrates another new hose construction of this invention, FIG. 10 illustrating certain parts of the hose construction broken away.

While the various features of this invention are hereinafter illustrated and described as being particularly adapted to provide a flexible hose construction for conveying gasoline and like volatile liquid therethrough, it is to be understood that the various features of this invention can be utilized singly or in various combinations thereof to provide a flexible hose construction for conveying any other fluid therethrough for other types of apparatus as desired.

Therefore, this invention is not to be limited to only the embodiments illustrated in the drawings, because the drawings are merely utilized to illustrate one of the wide variety of uses of this invention.

As previously stated, it is one feature of this invention to dispose a second tube of polymeric material inside an inner corrugated tube of each of the hose constructions set forth in the aforementioned copending parent patent application, Ser. No. 405,487, filed Sep. 11, 1989, such as tube 100 of FIGS. 10 and 11 and tube 100D of FIGS. 12 and 13.

It is also a feature of this invention to replace the inner corrugated hose of each hose construction of this invention as set forth in the aforementioned copending parent patent application, Ser. No. 405,487, filed Sep. 11, 1989, as well as in FIGS. 10–13, with rib and an inner tube of polymeric material, such as the rib 200 and inner tube 100E of FIGS. 14 and 15.

Therefore, it is believed that it would be best to first fully set forth the structures and methods of such copending parent patent application before describing the hose constructions of this invention that are generally indicated by the reference numerals 20E, 20F, 20G, 20H, 20I, 20J, 20K, 20L, 20M, 20N and 20P in FIGS. 12–35 while the hose constructions of such copending parent patent application are illustrated in FIGS. 1–9.

Referring now to FIG. 1, the new flexible hose construction of this invention is generally indicated by the reference numeral 20 and comprises an inner corrugated hose 21 formed of any suitable polymeric material and having a plurality of outwardly convex projections 22 with recesses 23 therebetween and extending from one end 24 to the other end 25 thereof, a tube 26 of any suitable polymeric material extending in a generally straight-line manner from projection 22 to projection 22 as illustrated in FIG. 3, an outer sleeve 27 of reinforcing material disposed in telescoping relation on the tube 26, and an outer layer 28 of any suitable polymeric material that will provide a protection for the sleeve 27 of reinforcing material and also to tend to prevent any liquid that is conveyed through the flexible hose construction 20 from permeating to the exterior thereof, such as gasoline and the like.

As previously stated, it was found according to the teachings of this invention that the hose construction 20 can be relatively flexible because of the corrugated inner hose 21 thereof.

However, it was further found according to the teachings of this invention that the flexibility characteristics of such a hose construction 20 is diminished if a sufficient amount of the reinforcing means 27 is received in the recesses 23 of the inner hose 21 to resist the bending thereof.

Therefore, it was further found according to the teachings of this invention that by providing the tube 26 of polymeric material on the inner hose 21 before disposing the reinforcing sleeve 27 thereon with the tube 26 being so constructed and arranged that the same extends substantially from the apex 29 of one projection 22 to the next apex 29 of the next adjacent projection 22 in a substantially straight-line manner illustrated in FIG. 3, the tube 26 will substantially resist the penetration of the reinforcing layer 27 into the recesses 23 of the inner hose 21 to any great degree even though the reinforcing layer 27 is being forced radially inwardly either through the normal effect of applying the same onto the inner hose 21 and/or by the force of the outer cover 28 being applied over the reinforcing means 27 in a conventional hose forming manner, such slight penetration of the reinforcing 27 being illustrated in FIGS. 4 and 5, whereby it can be seen that the recesses 23 remain substantially void of the reinforcing 27 so as to retain the desired flexibility characteristics of the inner hose 21.

While the inner hose 21 of the hose construction 20 of this invention can be formed of any suitable material and in any suitable manner, one working embodiment thereof comprises thermoplastic material that is blow molded in a conventional manner into the configuration illustrated in FIG. 2 wherein the convolutions or projections 22 thereof are annular and are uniformly spaced from each other throughout the length of the hose 21 or can be disposed in a helical manner throughout the length of the hose as represented by the projections 22A illustrated in FIG. 6 wherein another inner hose of this invention is indicated by the reference numeral 21A and parts thereof similar to the inner hose 21 previously described are indicated by like reference numerals followed by the reference letter "A". The inner hose 21A is made in a conventional manner by spirally wrapping a strip 30 that has the projections 22A and recesses 23A formed therein in any suitable manner and forming a helically disposed seam 31 throughout the length of the inner hose 21A.

One problem with thermoplastic hoses currently being made is the stiffness thereof when compared to elastomeric rubber hoses of the same inner and outer dimensions. The stiffness of the prior known thermoplastic hoses is due to the rigidity of the plastic material. However, by using a convoluted or corrugated inner tube, the flexibility of the thermoplastic hose can be made greater than a rubber hose of the same size. The convolutions can be annular in nature and their geometry can be dependent upon the size of the hose to be produced.

A thermoplastic hose with a corrugated inner tube also has other advantages over conventional rubber hoses.

In particular, a plastic hose construction built with a convoluted inner corrugated hose has better kink resistance and a smaller bend radius than a rubber hose of the same size.

These properties are a result of the annular rings that form the convoluted tube. These annular rings provide hoop strength that results in superior kink resistance and smaller bend radius compared to smooth inner tube hoses.

Also, a corrugated inner hose of plastic material is lighter in weight per foot than a rubber hose. To reduce kinking and bend radius, conventional rubber hoses rely on thick hose walls and/or a helix wire. In contrast, the corrugated plastic hose 21 of this invention provides an excellent kink resistance so that a lightweight, thin wall hose construction 20 can be built without compromising kink resistance or bend radius.

The long-term resistance of plastic materials to degradation and wear is greater than that of rubber materials. For example, a large number of plastic materials are available with much better resistance to hydrocarbon-based liquids, such as gasoline, than standard rubber compounds. Certain thermoplastics offer greater ozone, abrasion and UV resistance than rubber compounds. Thermoplastics are also more easily colored and are more colorfast.

Therefore, the thermoplastic material of the inner hose 21 of this invention is chosen based on the chemical and thermal resistance requirements of the application of the hose construction 20 and based on a means to bond the corrugated inner hose 21 to the subsequently disposed layers thereon.

Thus, the inner hose 21 can comprise a single layer of a homogeneous thermoplastic material as illustrated in FIGS. 2–6 or the same can comprise an inner layer 21' of one type of thermoplastic material and an outer layer 21" of another type of thermoplastic material as provided for the inner hose 21B illustrated in FIG. 9 as it is well known that two plastic materials can be extruded together to form a tubular member having one material forming the outer surface thereof and the other material forming the inner surface thereof and thereafter such tubular member can be blow molded to form the same into a corrugated tubular member.

In any event, the tube 26 of polymeric material can be applied over the inner hose 21 either as a continuous tube by conventional extruding apparatus whereby the exuding tube 26 bonds by the nature thereof to the apexes 29 of the projections 22 in the substantially straight-line manner illustrated in FIG. 3 or the tube 26 could be disposed in a spiral manner as illustrated in FIG. 7 and comprise a strip 32 of polymeric material that is helically wound onto the inner tube 21A as illustrated in FIG. 7. However, it is to be understood that the inner tube 21A illustrated in FIG. 7 could be the inner tube 21 of FIG. 2 or the inner tube 21B of FIG. 9 rather than a tube wherein the projections are disposed in a helical manner, as desired.

In any event, it can be seen that the tube 26 provides a smooth surface over the convolutions 22 and provides a consistent base for receiving the reinforcement 27 thereon. The material of the tube 26 can be chosen so that it will adhere to the outer surface of the apexes 29 of the inner tube 21 so that the layer 26 does not fill the recesses 23 of the inner tube 21 and is applied in a manner to just cover the convolutions 22 in substantially the straight-line manner illustrated in FIG. 3 because, as previously stated, if the layer 26 were to fill the recesses 23, not only would the tube 26 then reduce the flexibility of the inner hose 21, but also the same would then allow the reinforcement 27 to enter those recesses 23 to further reduce the flexibility of the inner hose 21.

After the outer tube 26 has been applied in place in the manner previously set forth, the reinforcement sleeve 27 of either a braided textile material or a metal wire material that is wound in alternating directions is disposed over the tube 26 and the amount of reinforcement provided is dependent upon the working pressure requirements of the hose construction 20.

For example, the reinforcement sleeve 27 is illustrated as a braided material in FIG. 4 and thereby comprising a seamless sleeve of such material whereas the reinforcement 27A of FIG. 7 is illustrated as two layers of helically wound wire material disposed in opposite directions on the tube 26A.

In any event, it can readily be seen in FIG. 4 that the reinforcement sleeve 27 does not enter the recesses 23 of the inner hose 21 to any substantial amount because the tube 26 prevents the same from being forced into the recesses 23 as the reinforcement sleeve 27 is being applied to the desired thickness on the inner tube 21.

Thereafter, the outer layer 28 of any suitable polymeric material is applied over the reinforcement 27 such as by being extruded as a continuous tube thereof by conventional extruding apparatus to complete the hose construction 20 or by being applied in a helically wound form thereof from a strip 33 of such outer material in the manner illustrated in FIG. 8 to complete the hose construction 20A.

In any event, the outer layer 28 provides protection for the reinforcement 27 and can readily bond to the inner tube 26 by exuding through the reinforcement 27 in a manner well known in the art and as illustrated in FIG. 5 so as to hold all of the layers of the hose construction 20 in a bonded condition thereof, if desired.

The material of the outer layer 28 not only protects the reinforcement 27 from physical or chemical damage, but also the cover layer 28 is chosen with consideration to the environment and bondability to the other layers of the hose construction 20. In addition, the material 28 can be chosen so as to tend to prevent the liquid flowing through the hose construction 20 from permeating through the hose construction 20 to the exterior thereof.

As previously stated, the materials of the hose construction 20 of this invention can be any suitable materials that function in the manner previously set forth.

Therefore, the following example of one working embodiment of the hose construction 20 of this invention is not to be a limitation on this invention and is merely being given as one working example thereof.

In the one working embodiment of this invention, the inner hose is formed in the manner of FIG. 9 with the inner layer 21' comprising a thermoplastic material sold by DuPont as Zytel ST811HS and with the outer layer 21" thereof comprising a thermoplastic material sold by the B.F. Goodrich Company as ESTANE 5710F1. Such material is blow molded to form the hose 21B with an inside diameter of approximately 1.500 of an inch and with the distance between the apexes 29B of the projections 22B being approximately 0.246 of an inch. The thickness of the inner portions 34 of the hose 21B is approximately 0.045 of an inch while the sidewalls 35 between the portion 34 and the apexes 29B are actually disposed at an angle relative to each other rather than being parallel to each other as illustrated in FIGS. 2 and 3, such angle of each sidewall 35 being approximately 10° to a true transverse line passing through the inner hose 21B.

The tube 26 in such working embodiment of the hose construction 20 of this invention also comprises the thermoplastic material ESTANE 5710F1 and is approximately 0.040 of an inch thick while the reinforcement 27 comprises a polyester yarn formed on a thirty-six carrier braiding machine with two ends per carrier and the outer layer 28 comprises the thermoplastic material ESTANE 5710F1 and is approximately 0.060 of an inch thick.

In this manner, the thermoplastic material of the cover 28 readily bonds to the tube 26 and the thermoplastic material of the tube 26 readily bonds to the outer layer 21" of the inner tube 21B.

Therefore, it can be seen that the resulting hose construction 20 or 20A of this invention is readily adapted to be utilized for conveying any desired fluid therethrough, such as a volatile liquid, and will permit the hose construction 20 or 20A to be disposed in a bent configuration for such purpose as desired.

As previously stated, it is believed according to the teachings of this invention that a second tube of any suitable polymeric material can be disposed inside any of the hose constructions 20, 20A, etc., previously described and still permit the resulting hose construction to be relatively flexible for its intended purpose while such second tube of polymeric material will provide for a smooth flow of fluid therethrough as well as provide a layer of material inside the hose construction that is more likely to resist any adverse reactions from the type of fluid being conveyed through such a hose construction.

Figure 11:
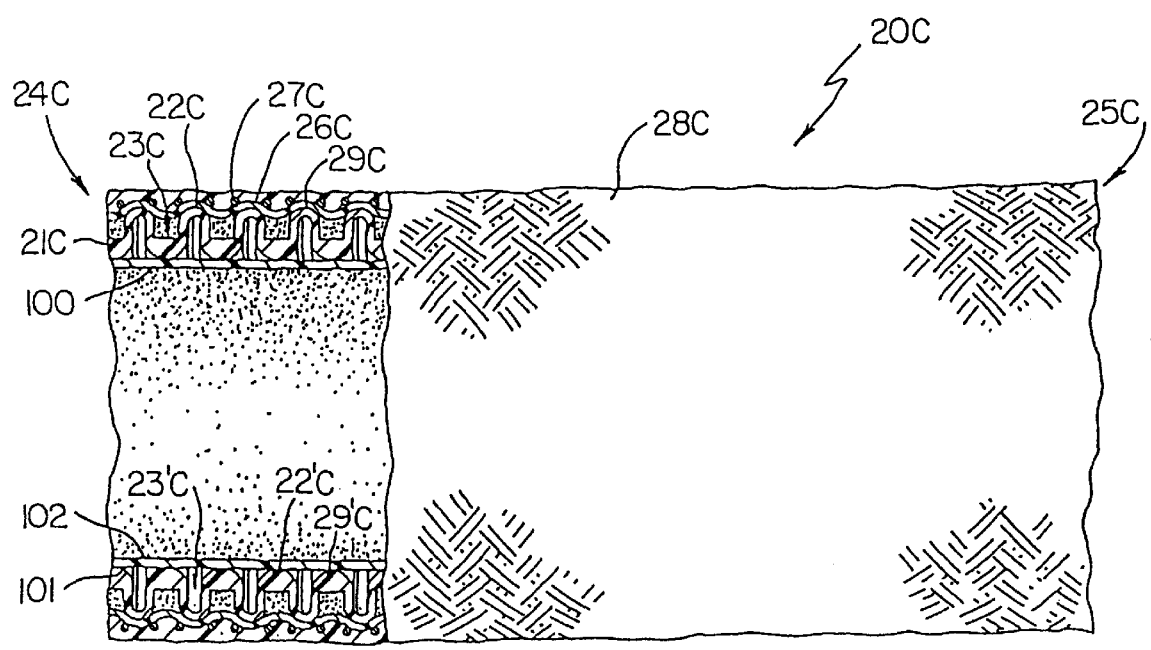
FIG. 11 is an enlarged fragmentary cross-sectional view taken on line 11—11 of FIG. 10.

In particular, another new hose construction of this invention is generally indicated by the reference numeral 20C in FIGS. 10 and 11 and parts thereof similar to the hose construction 20 and 20A previously set forth are indicated by like reference numerals followed by the reference letter "C".

As illustrated in FIGS. 10 and 11, it can be seen that the inner corrugated tube 21C of the hose construction 20C has the outwardly facing convex projections 22C and outwardly facing recesses 23C therebetween, such outwardly facing projections 22C defining inwardly facing recesses 23'C and such outwardly facing recesses 23C defining inwardly facing convex projections 22'C as illustrated in FIG. 11.

The hose construction 20C has the first tube of polymeric material 26C bonded or otherwise secured to the apexes 29C of the outwardly facing projections 22C in the manner previously set forth together with the reinforcement layer 27C and the outer cover material 28C respectively disposed thereon in the manner previously set forth.

However, before the inner corrugated hose 21C is formed, the second tube 100 is first formed in any suitable manner so as to have a smooth external peripheral surface 101 and a substantially smooth inner peripheral surface 102 while being formed of any suitable polymeric material. Thereafter, the inner corrugated tube 21C is blow molded onto the tube 100 in such a manner that the inwardly facing projections 22'C of the forming hose 21C engage against the external peripheral surface 101 of the tube 100 and, in fact, bond thereto by the nature of the material thereof so that the outer peripheral surface 101 of the second tube 100 engages the inwardly facing convex projections 22'C at the apexes 29'C thereof in a generally straight-line manner from one end 24C to the other end 25C of the hose construction 20C. Thereafter, the tube 26C, reinforcement sleeve 27C and cover 28C are serially disposed on the inner corrugated hose 21C in the manner previously set forth to complete the hose construction 20C of this invention.

While the hose construction 20C of this invention has been previously described as first forming the inner tube 100 before the corrugated hose 21C is formed thereon, it is to be understood that the hose 21C could be formed first with the inner tube 100 being subsequently formed therein, the hose 21C and the inner tube 100 could be separately formed and then be assembled together, or the inner hose 100 and corrugated hose 21C could be substantially simultaneously formed together in substantially the same manner as set forth in the aforementioned U.S. Pat. No. 4,312,383 to Kleykamp. Whereby this patent is being incorporated into this disclosure by this reference thereto.

In any event, it is believed that the tube 100 will not diminish the flexibility characteristics of the hose construction 20C to any great amount so that the hose construction 20C can be utilized in any of the manners as the hose constructions 20 and 20A previously described or for other purposes as desired.

In fact, should the inner hose 21C be formed in the manner illustrated in FIG. 9 wherein an outer layer of material 21" and an inner layer 21' is provided, it is believed that such inner layer 21' could be selected so as to be readily bondable and/or compatible with the material of the tube 100 of this invention so that the tube 100 could be of a material other than the material that forms the outer tube 26C as desired.

Figure 12:
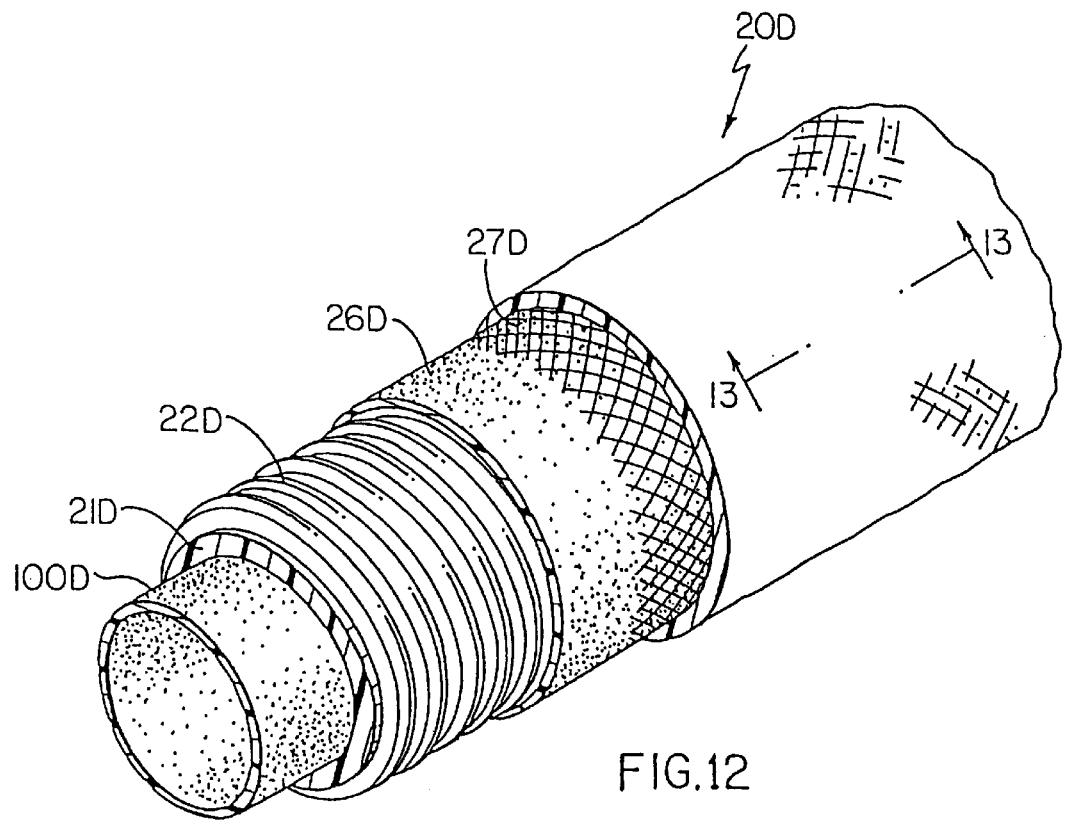
FIG. 12 is a view similar to FIG. 10 and illustrates another hose construction of this invention.
Figure 13:
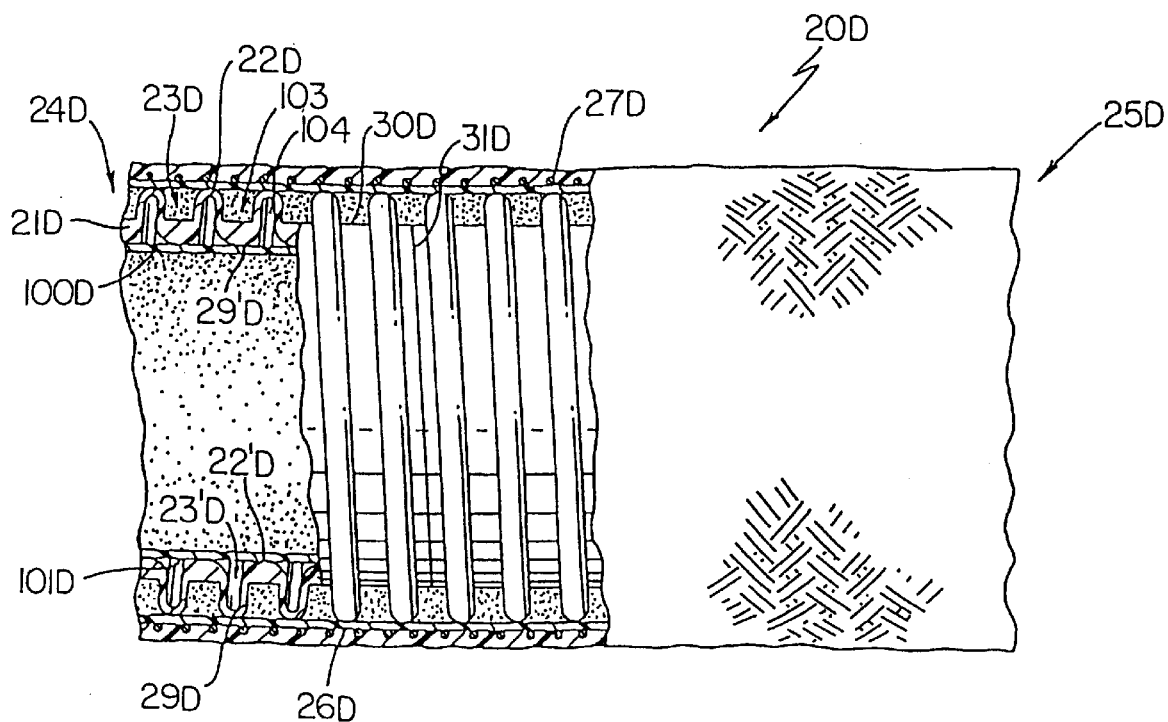
FIG. 13 is an enlarged fragmentary cross-sectional view taken on line 13—13 of FIG. 12.

Further, while the inner tube 21C is illustrated as having the projections 22C and 22'C thereof each being annular so as to be disposed substantially transverse to the longitudinal axis of the hose construction 20C, it is to be understood that the inner hose could have the projections thereof disposed in helical paths, if desired, in the same manner as provided by the strip 30 of FIG. 6 whereby another hose construction of this invention is generally indicated by the reference numeral 20D in FIGS. 12 and 13 and parts thereof similar to the parts of the hose construction 20, 20A and 20C previously described are indicated by like reference numerals followed by the reference letter "D".

As illustrated in FIGS. 12 and 13, the hose construction 20D is substantially the same as the hose construction 20C previously set forth except that the outwardly facing projections 22D, outwardly facing recesses 23D, inwardly facing projections 22'D and inwardly facing recesses 23'D are all disposed in helical paths from the one end 24D of the hose construction 20D to the other end 25D thereof as illustrated in FIG. 13 while the various parts of the hose construction 20D are formed in the same manner as the hose construction 20C previously set forth.

Thus, it can be seen that the inner hose 21D of the hose construction 20D can be formed as a helical strip 30D and be helically disposed on the inner tube 100D to form the seam 31D as previously set forth in FIG. 6 while the inwardly facing projections 21'D are disposed in engagement with the external peripheral surface 101D of the inner tube 100D and be bonded thereto as previously set forth.

When the apexes 29'D of the inner tube 21D are bonded to the external peripheral surface 101D of the inner tube 100D, and the strip 30D of the tube 21D has the seams 31D thereof sealed together in any suitable manner, it can be seen that one helically disposed passage 103 is formed between the outwardly facing recesses 23D of the inner tube 21D and the outer tube 26D while another helically disposed passage 104 is defined between the inwardly facing recesses 23'D and the inner tube 100D whereby the passages 103 and 104 can be utilized for any desired purpose, such as for leak detection purposes, conveying like or different fluids from one end 24D to the other end 25D of the hose construction 20D, etc.

In any event, it can be seen that the hose construction 20C or 20D of this invention can be formed in a relatively simple manner by the methods of this invention to provide a hose construction for conveying volatile fluids through the inner tube 100 or 100D thereof for the same reason as the hose constructions 20 and 20A as previously described.

As previously stated, it is also a feature of this invention to replace the inner corrugated hose of each hose construction of this invention with a rib and an inner tube of polymeric material, such arrangements being illustrated in FIGS. 14–35 and will now be described.

Figure 14:
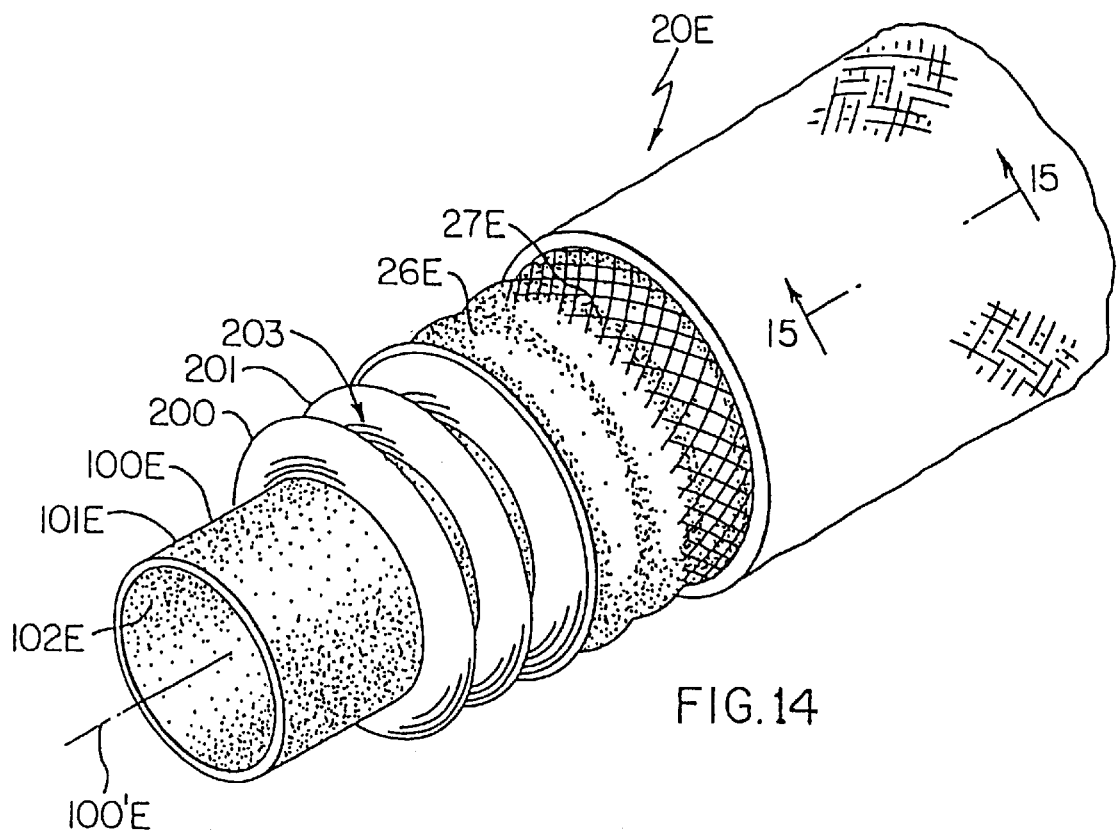
FIG. 14 is a view similar to FIG. 1 and illustrates another new hose construction of this invention, FIG. 14 illustrating certain parts of the hose construction broken away.
Figure 15:
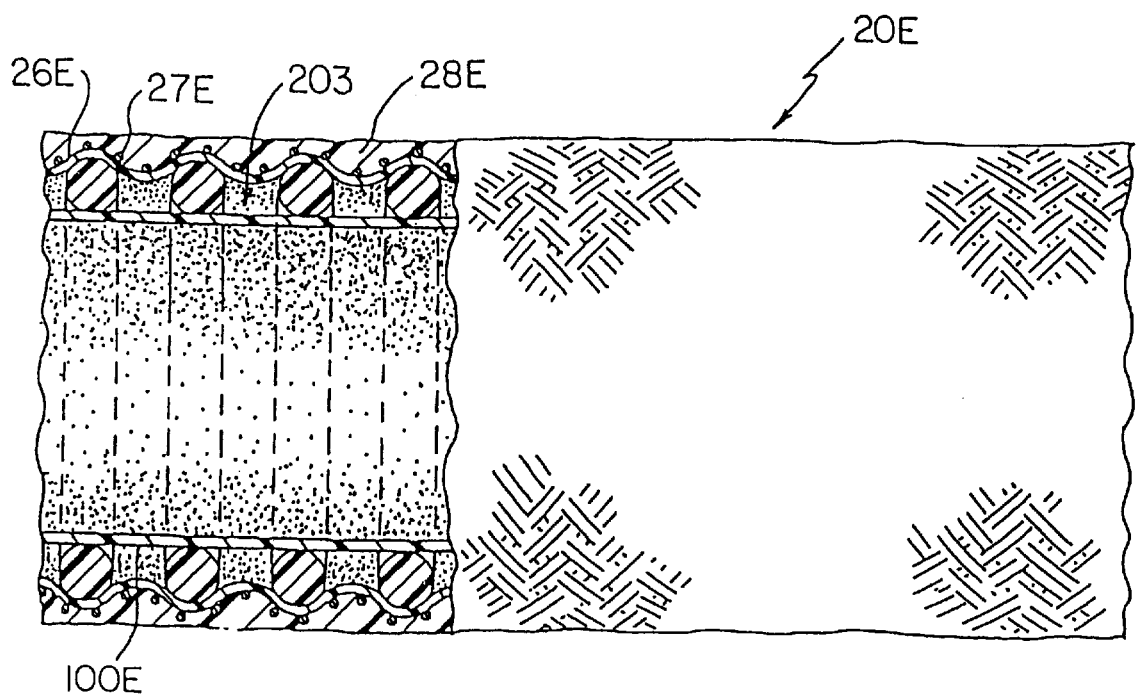
FIG. 15 is an enlarged fragmentary cross-sectional view taken on line 15—15 of FIG. 14.

Referring now to FIGS. 14 and 15, another hose construction of this invention is generally indicated by the reference numeral 20E and parts thereof similar to the hose constructions 20, 20A, 20B, 20C and 20D previously described are indicated by like reference numerals followed by the reference letter "E".

As illustrated in FIGS. 14 and 15, it can be seen that the hose construction 20E comprises an inner tube 100E formed of any suitable polymeric material and having a substantially smooth external peripheral surface 101E and a substantially smooth internal peripheral surface 102E in a manner similar to the inner tubes 100 and 100D previously set forth.

However, the hose construction 20E does not have the inner corrugated hose 21C or 21D previously set forth but in place thereof has rib 200 disposed between the inner tube 100E and the outer tube 26E of polymeric material that is disposed intermediate the rib 200 and the sleeve 27E of reinforcing material that is subsequently covered by the outer sleeve or layer 28E of polymeric material in any of the manners previously set forth.

The rib 200 is disposed on the inner tube 100E so as to define alternating coil 201 of rib 200 and coil of non-rib serially along the longitudinal axis 100'E, FIG. 14, of the inner tube 100E in a like repeating pattern thereof whereby it can be seen that the coil of non-rib comprise coil of void space that are generally indicated by the reference numeral 203, between adjacent coil 201 of rib 200 as illustrated in FIG. 15.

The coil 201 of rib 200 in FIGS. 14 and 15 comprise a plurality of separate coils 201 of the rib 200 that are disposed in spaced apart relation substantially transverse to the longitudinal axis 100'E of the inner tube 100E and thereby are annular coils 201 that can be uniformly spaced apart to define uniform coil of void space means 203 therebetween as illustrated in FIG. 15. Of course, any desired spacing, in any embodiment of this invention, could be provided rather than the uniform spacing that is illustrated throughout the drawings.

The coil 201 of rib 200 can be formed of any suitable material such as polymeric material, metallic material, etc., or combinations of suitable materials, that add rigidity to the hose construction 20E in a manner to hold the sleeve of reinforcing 27E spaced from the inner tube 100E and still permit the hose construction 20E to be bent into the desired shapes thereof so that the hose construction 20E is relatively flexible for the same reasons and for the same purpose as the hose constructions 20, 20A, 20B, 20C and 20D previously set forth.

It is believed that while the inner tube 100E can be first formed and then the coils 201 of rib 200 be formed thereon or be separately formed and subsequently disposed thereon in any suitable manner, it can be seen that the coil 201 of rib 200 engage against the external peripheral surface 101E of the inner tube means 100E and can actually be bonded thereto through the nature of the materials forming the rib 200 and the inner tube 100E as desired. Of course, it is believed that the coil 201 of rib 200 and the inner tube 100E could be simultaneously formed if desired so as to form a one-piece homogeneous structure.

In any event, the outer sleeve or tube 26E of polymeric material is disposed on the coil 201 of rib 200 in a generally straight-line manner coil means 201 of to coil means 201 of rib means 200 so as to tend to prevent the sleeve of reinforcing material 27E from entering into the coil of void space 203 as amount that would tend to substantially reduce the flexibility characteristics of the hose construction 20E all for the same reasons that such tube 26, 26A, 26B, 26C and 26D was previously utilized for their respective hose construction.

Thus, while FIG. 15, as well as other FIGS. of the drawings, illustrates that the outer tube, such as outer tube 26E, sags into the void space 203 a certain amount, it is to be understood that the outer tube 26E could be almost in a true straight-line relation, such as the straight-line relation provided by the inner tube 100E of FIG. 15 relative to the coil 201 of rib 200. However, the sag is illustrated in the drawings for the outer tube means 26E in order to show that it is believed that even a certain amount of penetration into the void space means 203 by the reinforcing means 27E still will not reduce the flexibility characteristics of the resulting hose construction 20E to any appreciable amount.

Accordingly, it can be seen that the resulting hose construction 20E of this invention is substantially the same as the resulting hose construction 20C of FIGS. 10 and 11 because the convoluted inner hose 21C of the hose construction 20C can be described as being a rib disposed on the inner tube 100 so as to define alternating coil 29C of rib and coil 23C of non-rib serially along the longitudinal axis of the inner tube 100 in a like repeating pattern thereof.

While the hose construction 20E of FIGS. 14 and 15 has been described as having the coil 201 of rib 200 directly engaging against the external peripheral surface 101E of the inner tube 100E, it is to be understood that any desired layer or layers of material could be disposed intermediate the coil 201 of rib 200 and the external peripheral surface 101E of the inner tube 100E, if desired.

Figure 34:
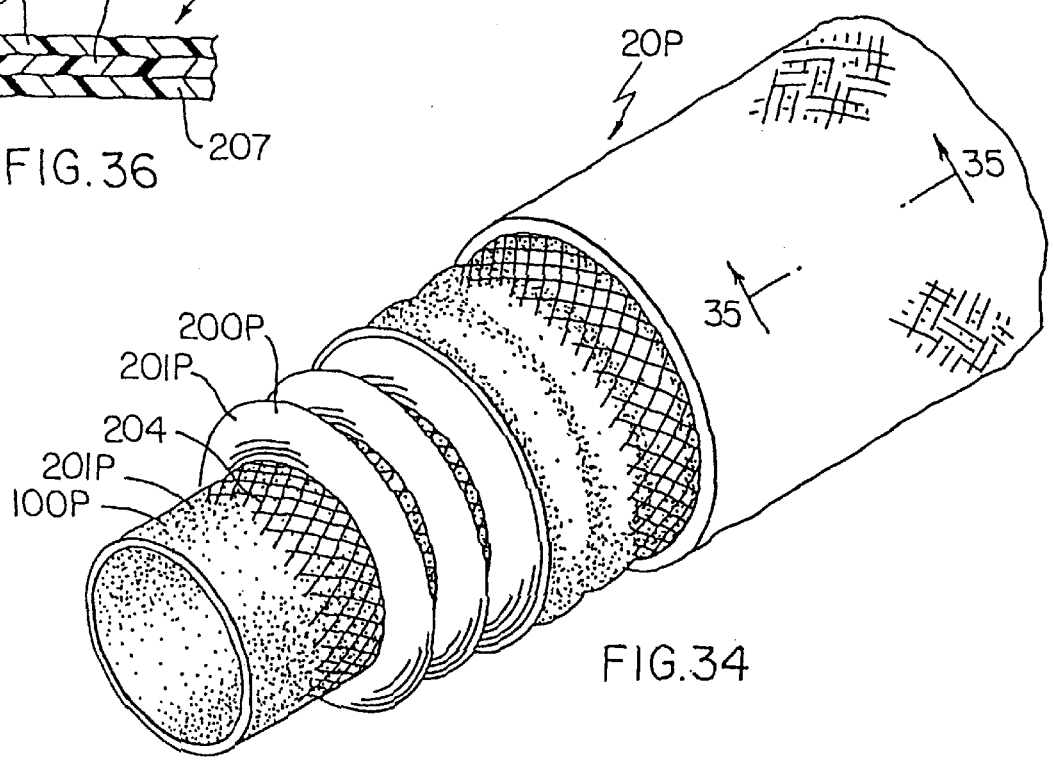
FIG. 34 is a view similar to FIG. 1 and illustrates another new hose construction of this invention, FIG. 34 illustrating certain parts of the hose construction broken away.
Figure 35:
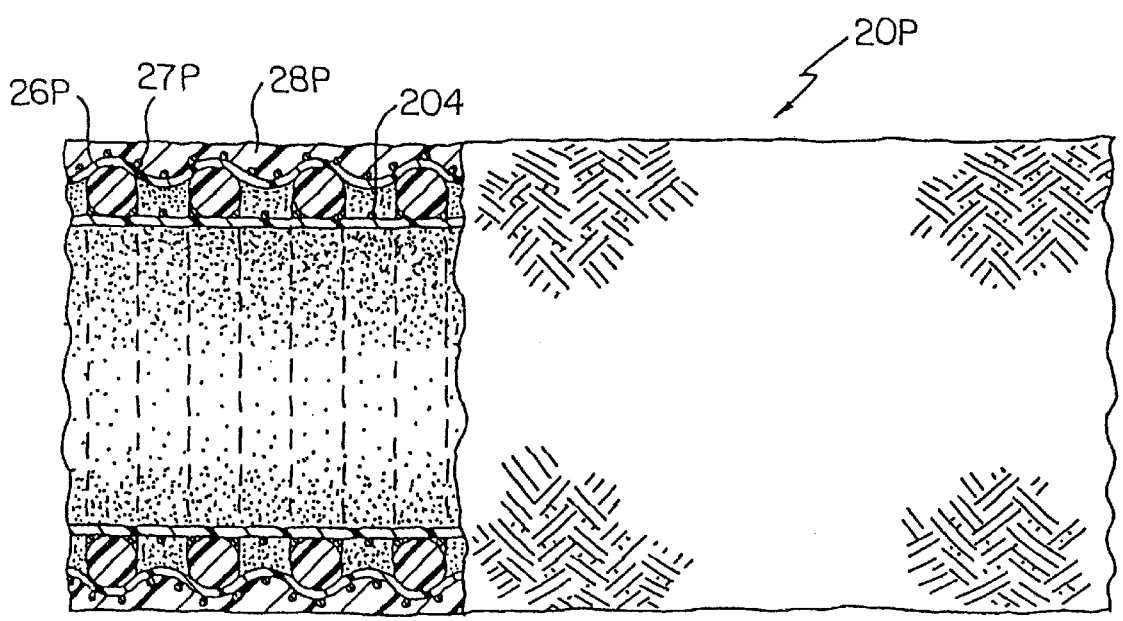
FIG. 35 is an enlarged fragmentary cross-sectional view taken on line 35—35 of FIG. 34.

For example, reference is now made to FIGS. 34 and 35 wherein another hose construction of this invention is generally indicated by the reference numeral 20P and parts thereof similar to the hose construction 20E are indicated by like reference numerals followed by the reference letter "P".

As illustrated in FIGS. 34 and 35, the hose construction 20P is substantially identical to the hose construction 20E previously described except that an intermediate layer or sleeve of reinforcing material 204 is disposed on the external peripheral surface 101P of the inner tube 100P so as to be disposed intermediate the inner tube 100P and the coil 201P of rib means 200P as illustrated. In addition, if the coil 201P of rib 200P are formed of polymeric material, such polymeric material could exude through the reinforcement sleeve 204 so as to bond directly to the external peripheral surface 101P of the inner tube 100P in substantially the same manner that the outer cover sleeve 28 exudes through the reinforcement layer 27 to bond to the inner tube 26 of the hose construction 20 previously set forth.

It is to be understood that while the coil 201 of rib 200, as well as the other rib of this invention that are hereinafter illustrated and described is illustrated as having a substantially circular transverse cross-sectional configuration, the same may have other shapes or combination shapes thereof such as rectangular, square, inverted trapezoidal, triangular, elliptical, etc.

Also, while the inner tube 100E of the hose construction 20E is illustrated as being a single layer of material, it is to be understood that the inner tube 100E, as well as all of the other inner tubes of this invention previously set forth or hereinafter shown or described as well as any of the inner corrugated hoses, such as the inner hose 21 previously set forth, can be formed of a plurality of different polymeric materials or other materials each protecting against leakage of a different fluid.

For example, it is well known that gasoline has many different additives therein with each additive requiring a different material to prevent migration of that additive through a containment hose or structure. In particular, gasoline has an additive of alcohol, an additive of ethanol, etc., in addition to the normal hydrocarbon liquid thereof so that the material forming the inner layer of the hose construction that is in contact with the fuel passing therethrough can have such different materials either uniformly mixed therein or such inner structure could comprise a plurality of separate layers bonded or fused together, as desired.

Figure 36:
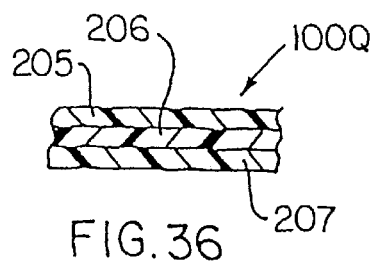
FIG. 36 is an enlarged fragmentary cross-sectional view of another inner tube of this invention for forming the various hose constructions of this invention.

For example, reference is now made to FIG. 36 wherein an inner tube of this invention is generally indicated by the reference numeral 100Q and comprises three different layers 205, 206 and 207 with the understanding that additional layers could form the inner tube 100Q with such layers being extruded together to form a tubular structure in substantially the same manner as the previously described multilayered tubular hose that has been subsequently blow molded into the corrugated structure 21B of FIG. 9.

While it is believed that the layers 205–207 can comprise different materials for the purposes previously set forth, it is believed that the layers 205–207 can be selected from the group including nylon, polyurethane, polyvinylalcohol, polyethylene, polypropylene, ethylenevinylalcohol. In such arrangement, it is believed that a layer of polyvinylalcohol can be disposed between a layer of nylon and a layer of polyurethane, if desired.

Thus, it can be seen that one or more layers, tubes or hoses of any of the hose constructions of this invention can provide structure for preventing different types of fluids from permeating therethrough with the material of the particular structure of the hose construction of this invention either being homogeneously formed or in layers that are fused together as desired so as to tend to prevent the leakage therethrough of a particular liquid, such as volatile liquids that each contain different additives, and, thus, from permeating to the exterior of the resulting hose construction using such structure.

While the hose construction 20E of this invention has the coil 201 of rib 200 disposed in an annular fashion so as to be transverse to the axis 100'E of the inner tube 100E, it is to be understood that the coil of rib means could be disposed in a helical path as desired.

Figure 16:
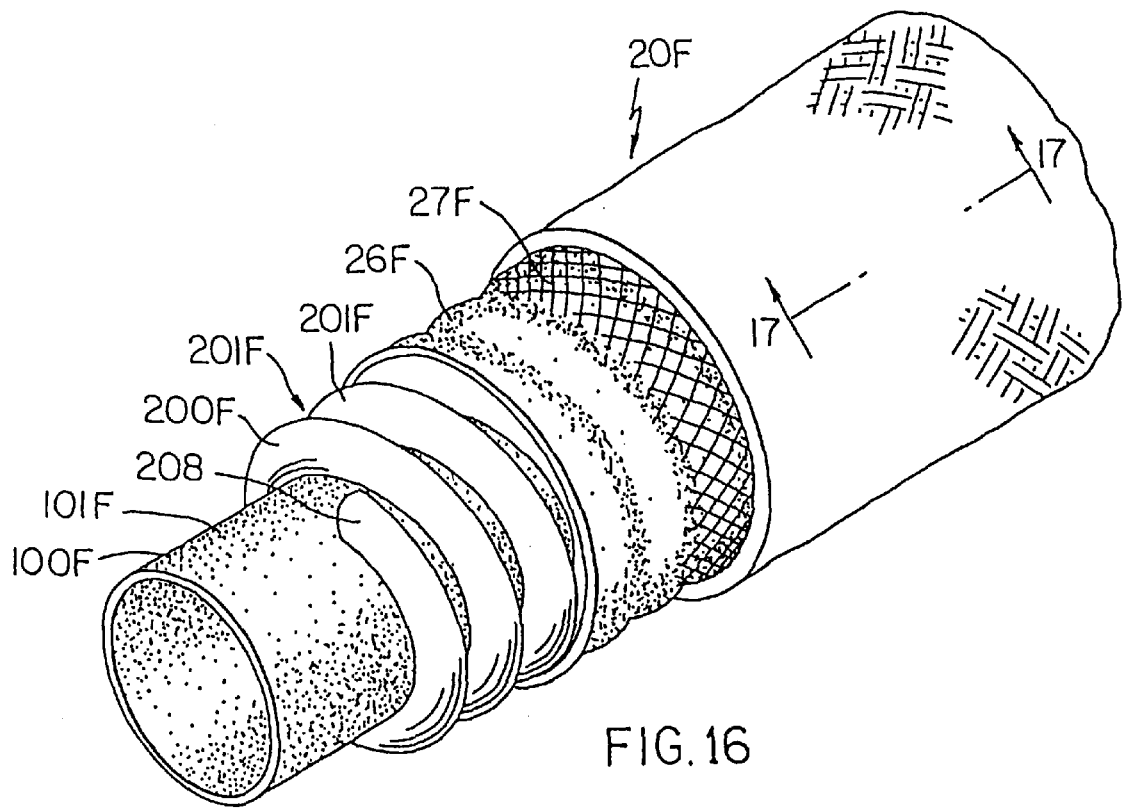
FIG. 16 is a view similar to FIG. 14 and illustrates another hose construction of this invention.
Figure 17:
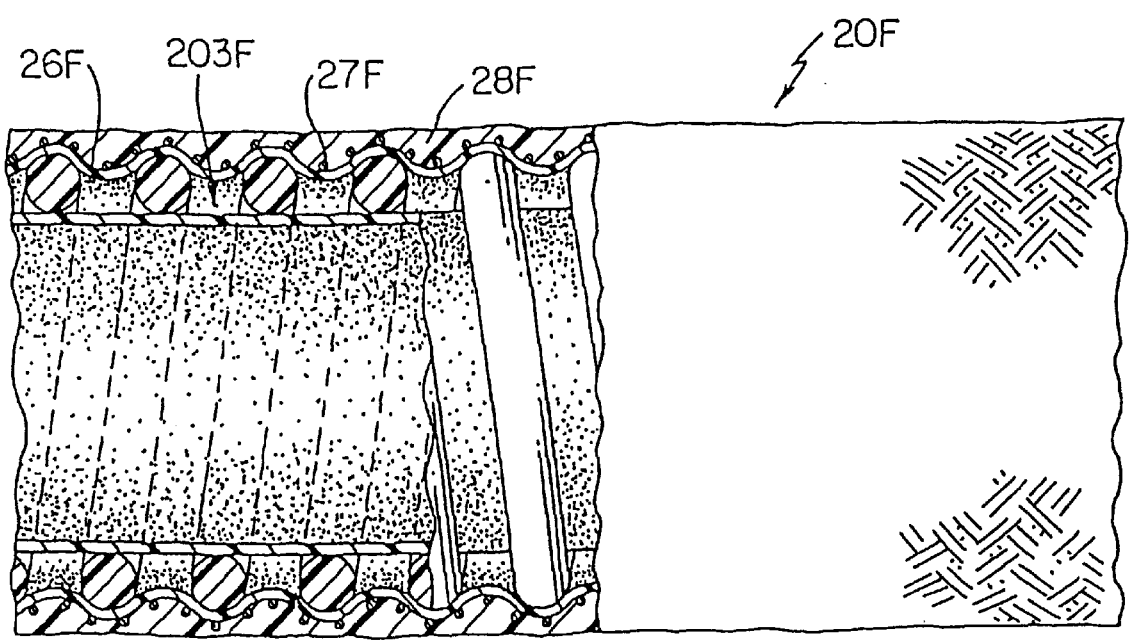
FIG. 17 is an enlarged fragmentary cross-sectional view taken on line 17—17 of FIG. 16.

Therefore, reference is now made to FIGS. 16 and 17 wherein another hose construction of this invention is generally indicated by the reference numeral 20F and parts thereof similar to the hose construction 20E previously described are indicated by like reference numerals followed by the reference letter "F".

As illustrated in FIGS. 16 and 17, the hose construction 20F is substantially identical to the hose construction 20E previously described except that the coil means 200F comprises a single continuous rib 208 disposed in a helical path about the external peripheral surface 101F of the inner tube 100F so as to define the coil 201F of rib 200F having a helically disposed coil 202F of void space 203F also disposed in the helical path as illustrated in FIGS. 16 and 17. Nevertheless, it can be seen that the outer tube 26F of polymeric material prevents the reinforcement sleeve 27F from entering into the void space 203F an amount that would diminish the flexibility characteristics of the hose construction 20F for the reasons previously set forth.

While the rib 208 can be formed of any suitable material in the same manner as the rib 200 previously set forth and is illustrated as being a single continuous member, it is to be understood that the coil 200F could comprise a plurality of rib members each being disposed in a helical path as desired.

Figure 18:
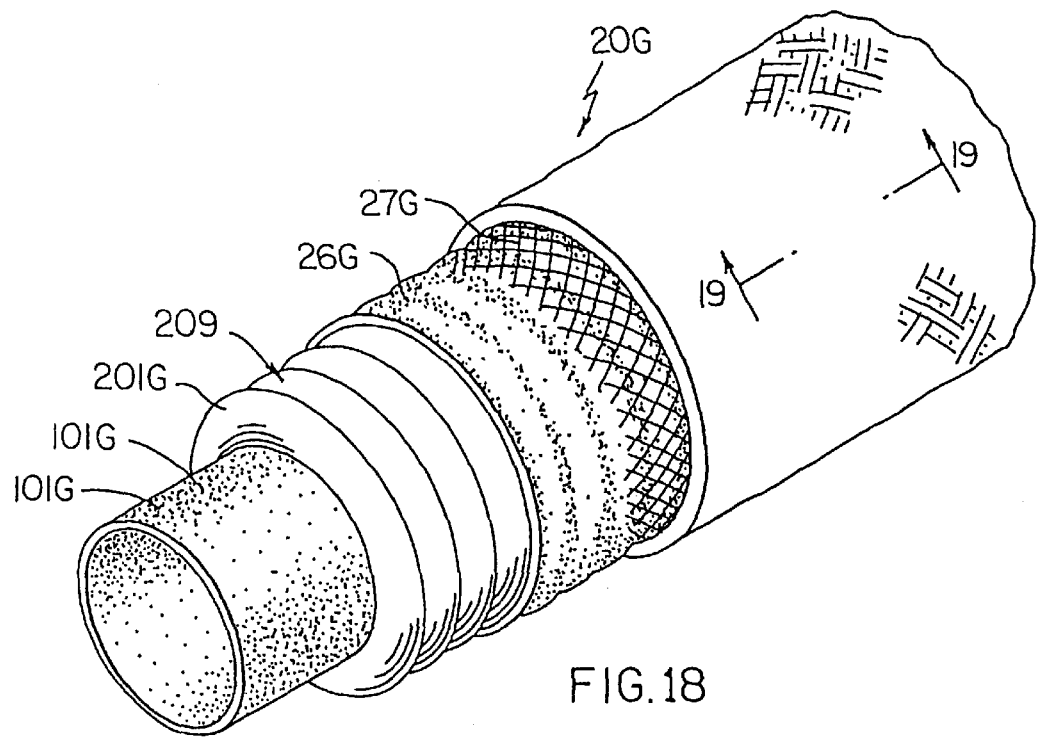
FIG. 18 is a view similar to FIG. 1 and illustrates another new hose construction of this invention, FIG. 18 illustrating certain parts of the hose construction broken away.
Figure 19:
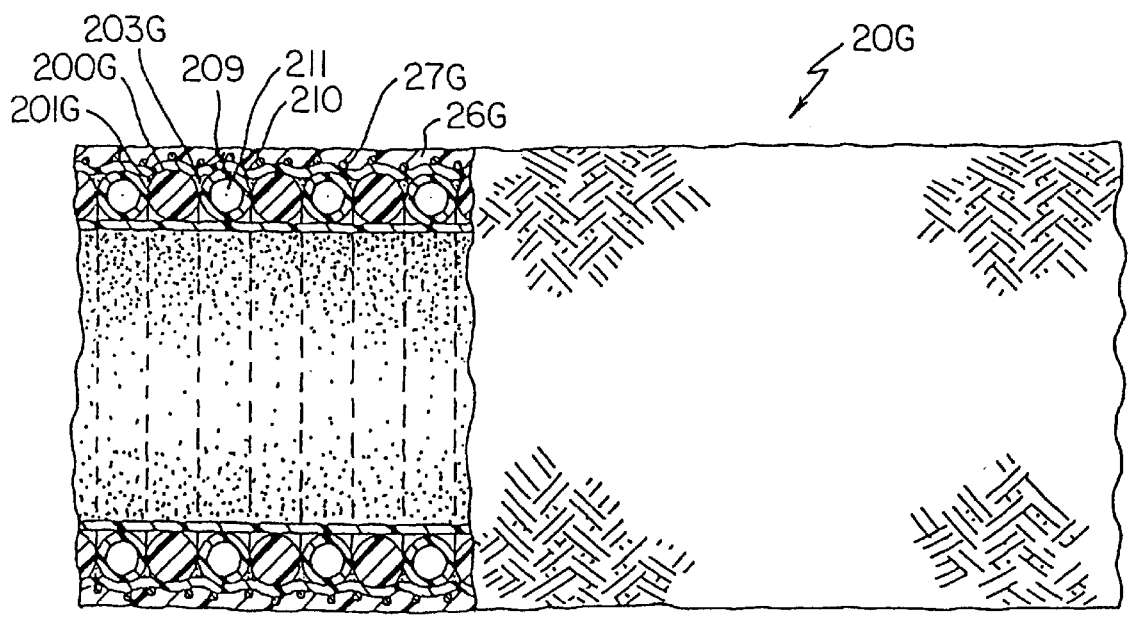
FIG. 19 is an enlarged fragmentary cross-sectional view taken on line 19—19 of FIG. 18.

Another hose construction of this invention is generally indicated by the reference numeral 20G in FIGS. 18 and 19 and parts thereof similar to the hose construction 20E previously described are indicated by like reference numerals followed by the reference letter "E".

As illustrated in FIGS. 18 and 19, the hose construction 20G is substantially identical to the hose construction 20E previously set forth except that coil 209 of collapsible tube 210 are disposed in the void space 203G that are disposed between adjacent coil 201G of rib means 200G as illustrated.

By forming each collapsible element or tube 210 as a thin walled hollow tubular member formed of any suitable collapsible material, such as a suitable polymeric material, and preventing the air in the opening or passage 211 of the element 210 from creating a dashpot effect therein, such as by venting the element 210, the elements 210 will collapse when the hose construction 20G is being flexed or bent so that the elements 210 do not appreciably reduce the flexibility characteristics of the hose construction 20G while at the same time initially help prevent the reinforcement layer 27G and outer tube 26G from entering into the void space 203G.

The tubular elements 210 can be bonded to the external peripheral surface means 101G of the inner tube 100G, if desired, and the inner tube 26G can be bonded to the collapsible elements 210 if desired.

While the coil 201G of rib 200G and collapsible elements 210 are annularly disposed so as to be transverse to the longitudinal axis of the inner tube 100G, it is to be understood that the same can be disposed as two continuous elements respectively in helical paths, if desired.

Figure 20:
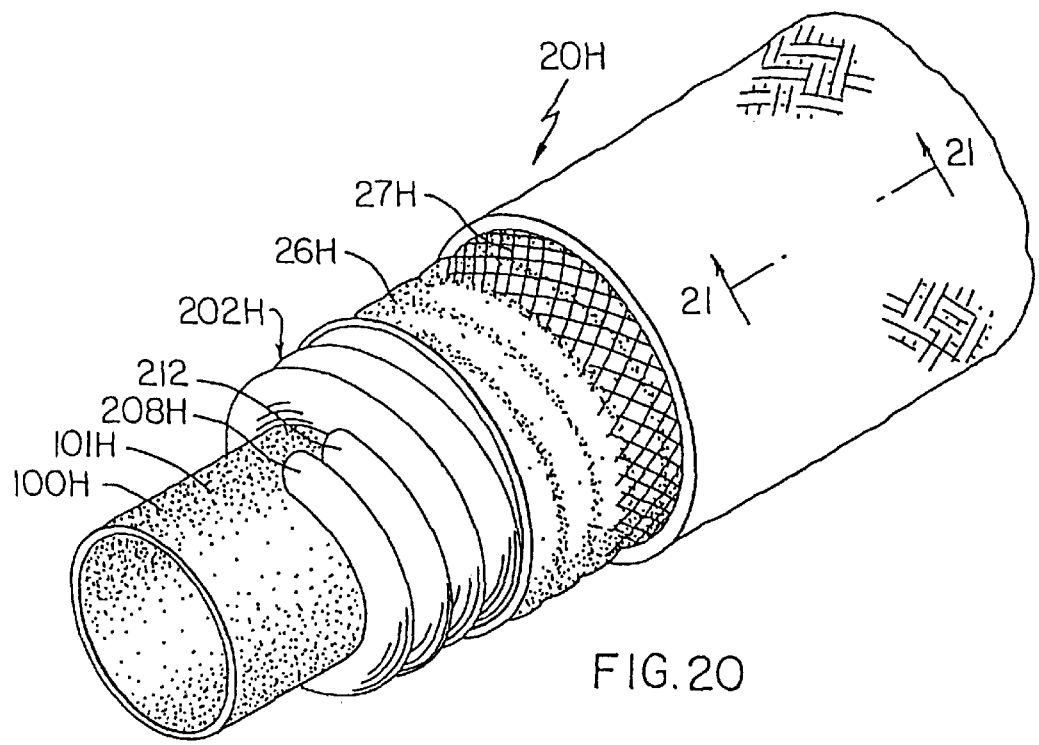
FIG. 20 is a view similar to FIG. 18 and illustrates another hose construction of this invention.
Figure 21:
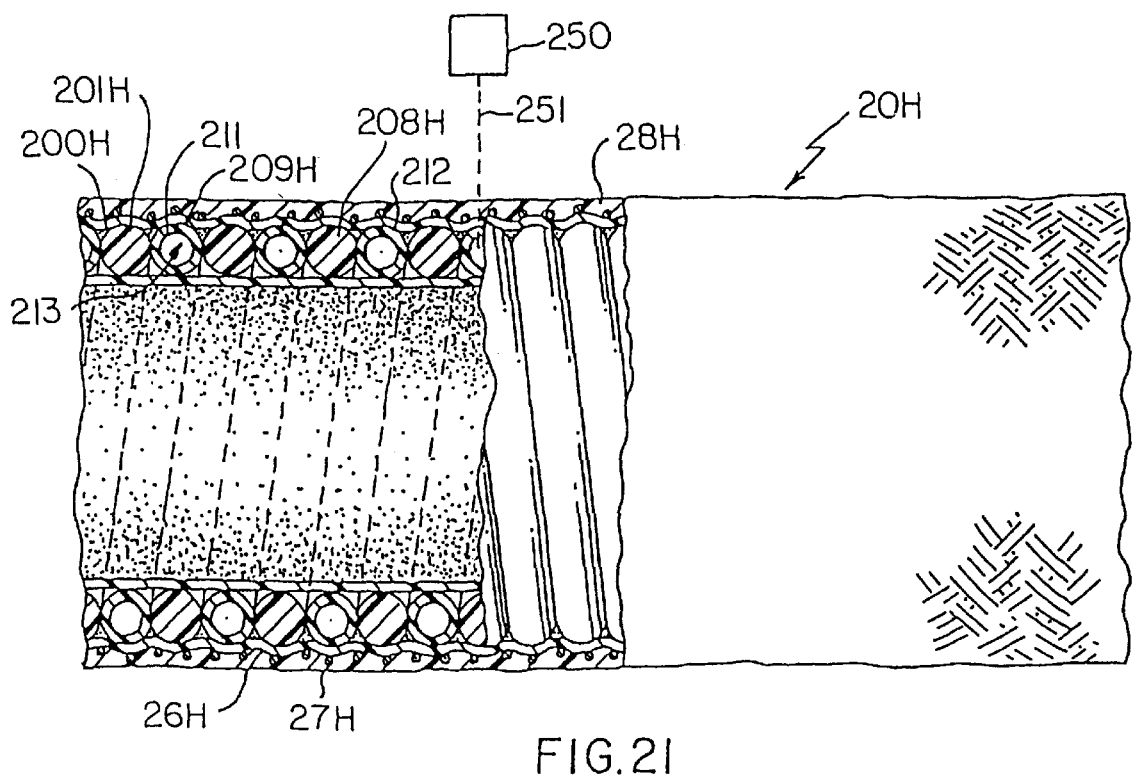
FIG. 21 is an enlarged fragmentary cross-sectional view taken on line 21—21 of FIG. 20.

For example, another hose construction of this invention is generally indicated by the reference numeral 20H in FIGS. 20 and 21 and parts thereof similar to the hose construction 20G previously described are indicated by like reference numerals followed by the reference letter "H".

As illustrated in FIGS. 20 and 21, the hose construction 20H has a continuous relatively rigid rib 208H and a continuous collapsible thin walled tube 212 respectively disposed in helical paths about the external peripheral surface 101H of the inner tube 100H to respectively define coil 201H of rib 200H and coil means 209H of collapsible tube means 210H in the coil means 203G of void space in substantially the same manner as set forth for the hose construction 20G previously described.

It is believed according to the teachings of this invention that a jelly-like substance can be disposed in any of the hollow elements 210 or 210H, or other hollow structure as hereinafter set forth that form the hose constructions of this invention, to tend to reduce the incidence of hose kinking when the hose is bent into a curve, such jelly-like substance being generally indicated by the reference numeral 213 in FIG. 21.

While the collapsible tube 210 and 210H has been previously described as being a thin wall hollow element, it is to be understood that it is believed that the collapsible could be other structure, as desired.

Figure 22:
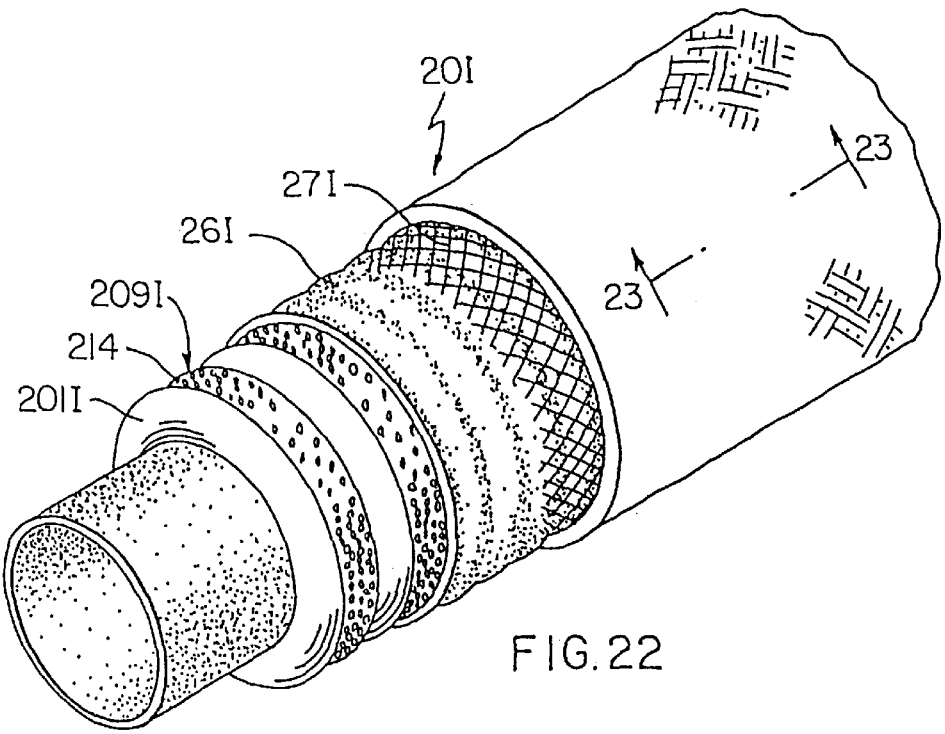
FIG. 22 is a view similar to FIG. 1 and illustrates another new hose construction of this invention, FIG. 22 illustrating certain parts of the hose construction broken away.
Figure 23:
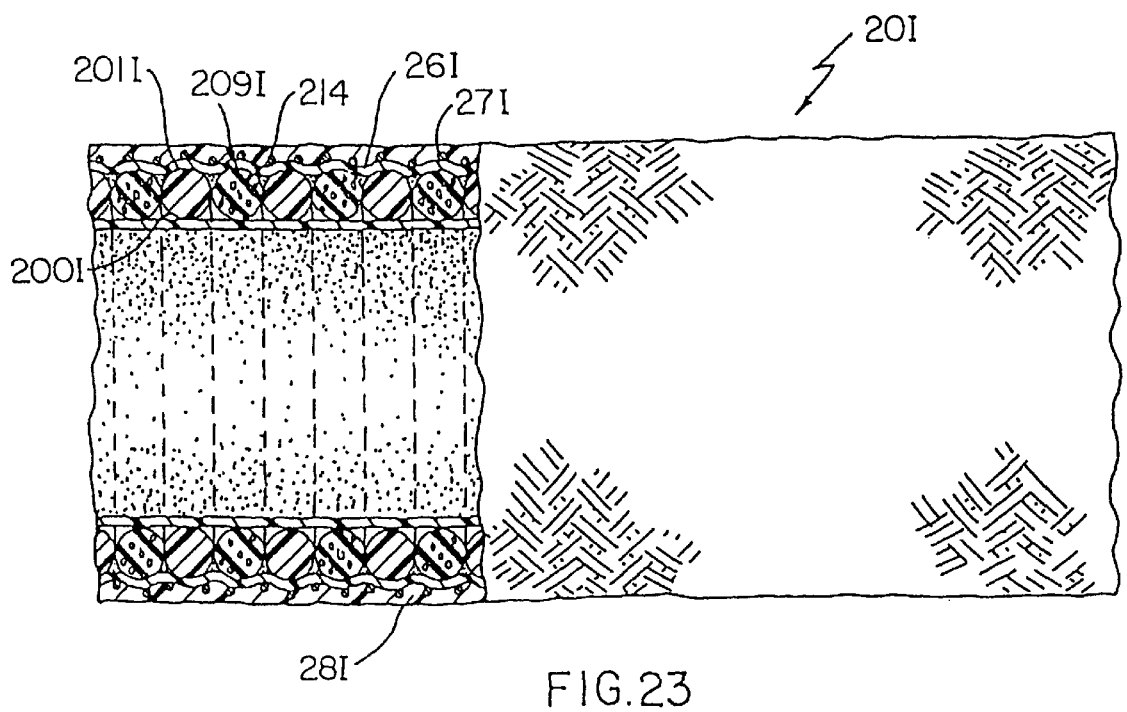
FIG. 23 is an enlarged fragmentary cross-sectional view taken on line 23—23 of FIG. 22.

For example, reference is now made to FIGS. 22 and 23 wherein another hose construction of this invention is generally indicated by the reference numeral 20I and parts thereof similar to the hose construction 20G previously described are indicated by like reference numerals followed by the reference letter "I".

As illustrated in FIGS. 22 and 23, the hose construction 20I is substantially the same as the hose construction 20G except that the coil 209I comprises elements 214 of foam rubber or other porous and spongy material whereby such elements 214 will collapse between the relatively rigid coil 201I of rib means 200I when the hose construction 20I is bent into the desired configuration thereof.

Figure 24:
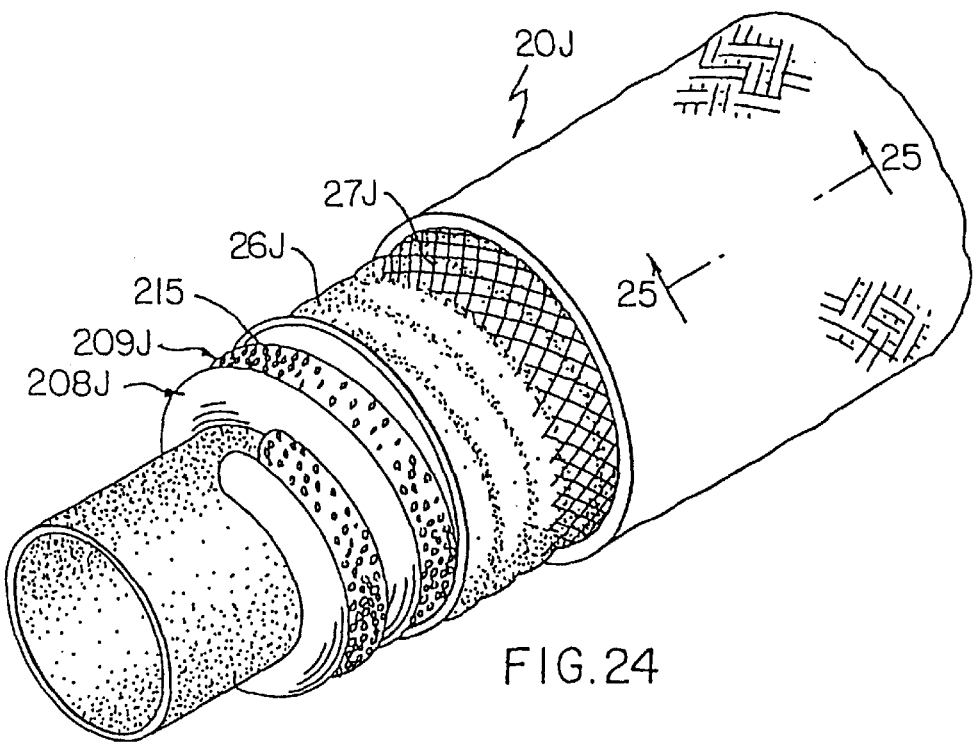
FIG. 24 is a view similar to FIG. 22 and illustrates another hose construction of this invention.
Figure 25:
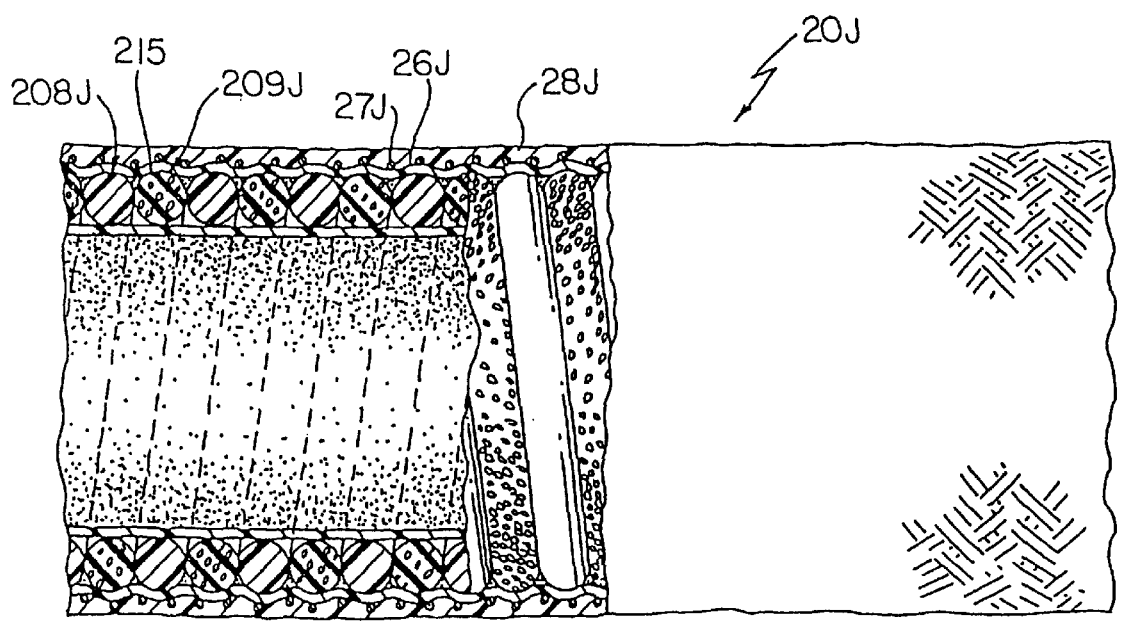
FIG. 25 is an enlarged fragmentary cross-sectional view taken on line 25—25 of FIG. 24.

Similarly, it can be seen that the hose construction 20J illustrated in FIGS. 24 and 25 is substantially identical to the hose construction 20H illustrated in FIGS. 20 and 21 with the collapsible coil means 209J comprising a single continuous foam rubber element 215 disposed in a helical path adjacent the helical path defined by the relatively rigid rib 208J.

While the coil of rib of the hose constructions 20E, 20F, 20G, 20H, 20I and 20J have been illustrated and described as being a solid structure, it is to be understood that the same can be hollow if desired.

Figure 26:
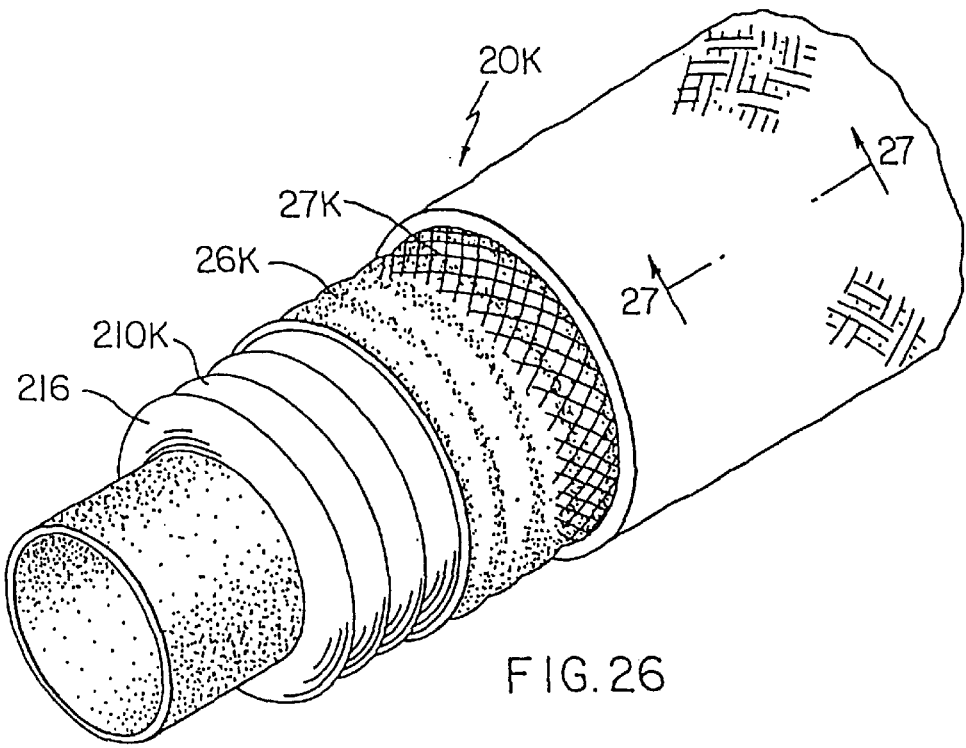
FIG. 26 is a view similar to FIG. 1 and illustrates another new hose construction of this invention, FIG. 26 illustrating certain parts of the hose construction broken away.
Figure 27:
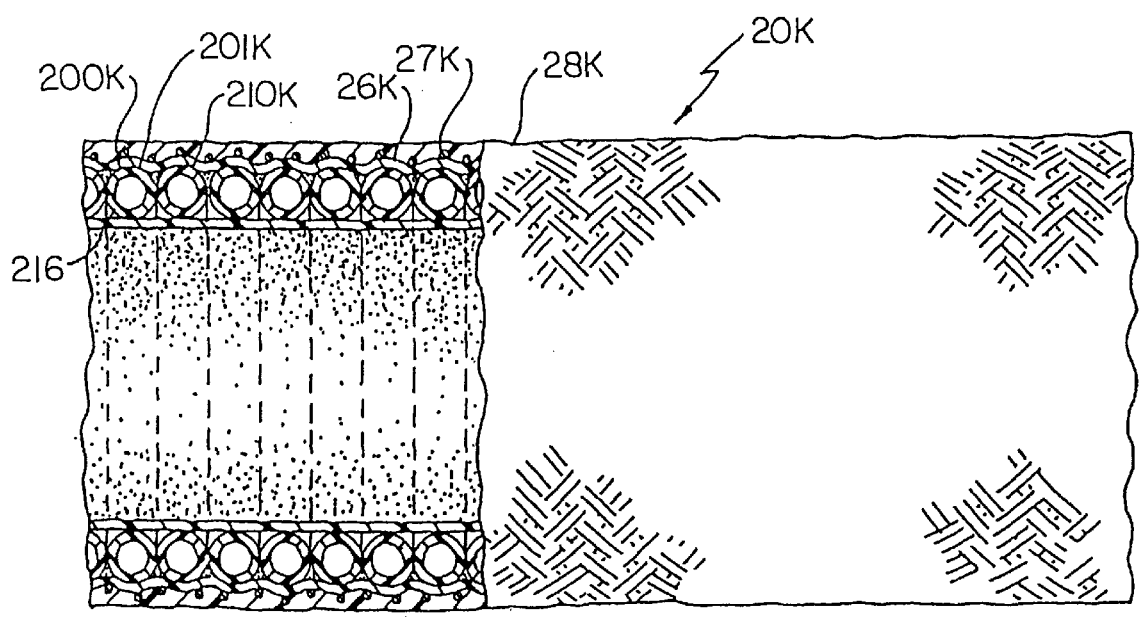
FIG. 27 is an enlarged fragmentary cross-sectional view taken on line 27—27 of FIG. 26.

For example, another hose construction of this invention is generally indicated by the reference numeral 20K in FIGS. 26 and 27 and parts thereof similar to the hose constructions previously described are indicated by like reference numerals followed by the reference letter "K".

As illustrated in FIGS. 26 and 27, it can be seen that the hose construction 20K is substantially identical to the hose construction 20G of FIGS. 18 and 19 except that the coil 201K of rib means 200K each comprises a hollow element 216 of relatively rigid material disposed intermediate each pair of adjacent hollow collapsible elements 210K whereby the more collapsible elements 210K will collapse in between adjacent relatively rigid elements 216 when the hose construction 20K is being bent for the reasons previously set forth.

Figure 28:
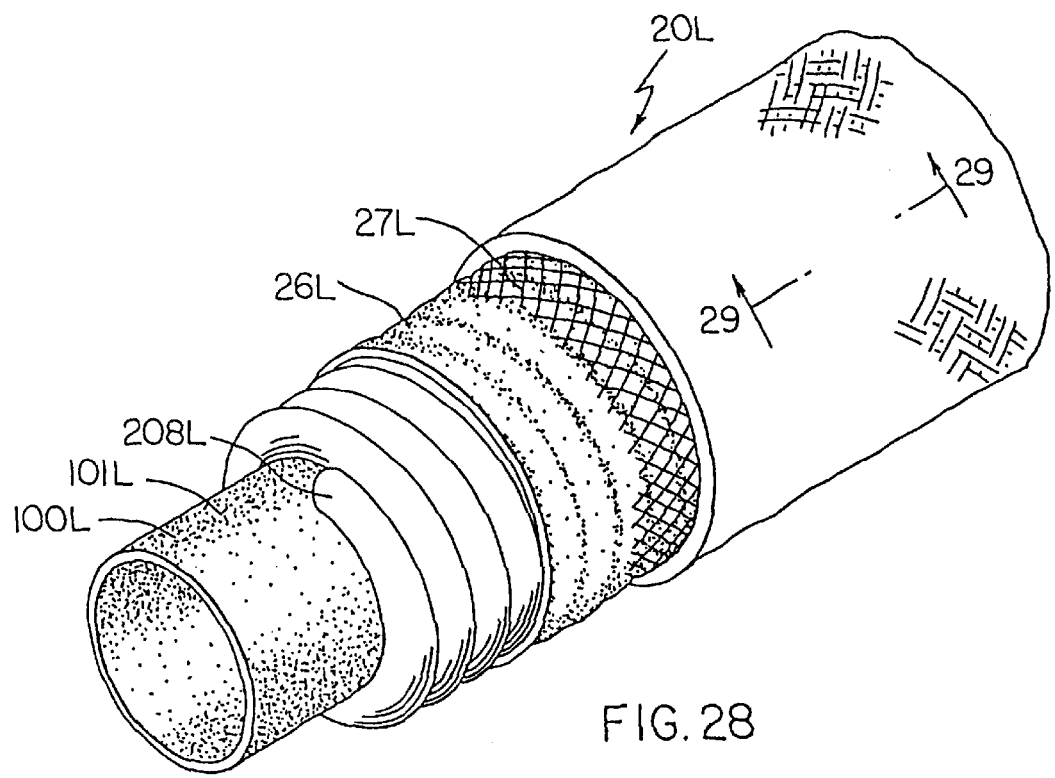
FIG. 28 is a view similar to FIG. 26 and illustrates another hose construction of this invention.
Figure 29:
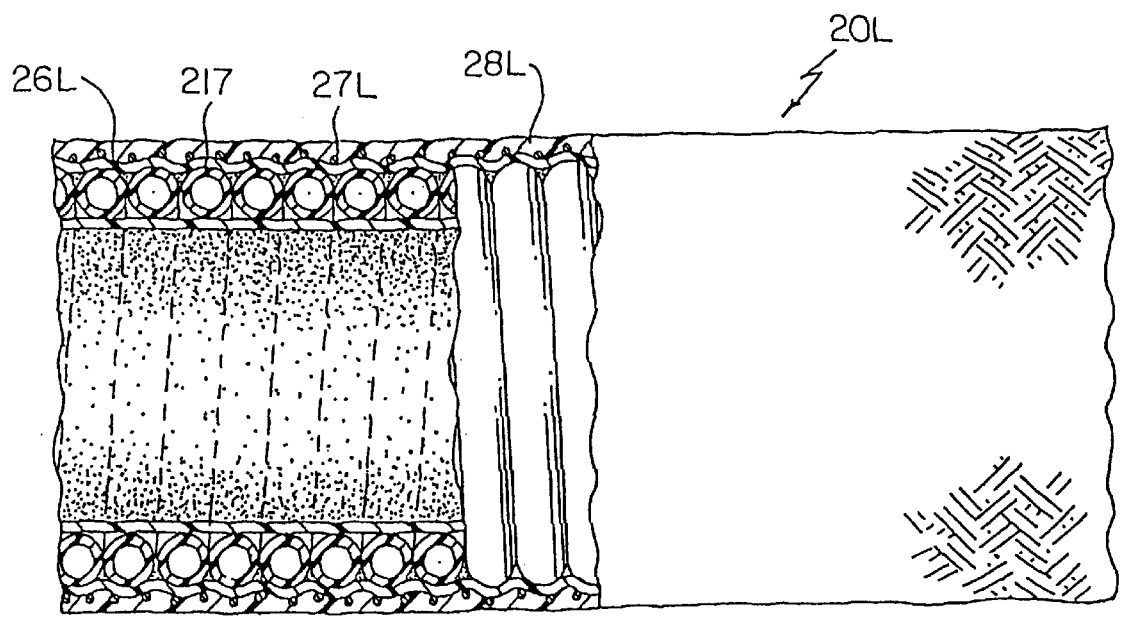
FIG. 29 is an enlarged fragmentary cross-sectional view taken on line 29—29 of FIG. 28.

As illustrated in FIGS. 28 and 29, another hose construction of this invention is generally indicated by the reference numeral 20L and parts thereof similar to the hose construction 20H are indicated by like reference numerals followed by the reference letter "L".

As illustrated in FIGS. 28 and 29, it can be seen that the hose construction 20L is substantially the same as the hose construction 20H previously described except that the continuous rib member 208L comprises a hollow element 217 disposed in the helical path illustrated and defines all of the turns thereof. However, it is to be understood that a plurality of continuous hollow members can comprise the helical structure in place of the single element 208L in the same manner that the two elements 208H and 212 are provided for the hose construction 20H previously described.

However, it is believed that when a single hollow tube 208L is utilized and is secured to the external peripheral surface 101L of the inner tube 100L and before the outer layers are disposed thereon, such subassembly of just the inner tube 100L and coiled hollow member 208L could as a subassembly be readily collapsed into a substantially flattened shape and this flattened shape could then be coiled into a roll for shipping. In this manner, the flattened shape could be uncoiled at the desired location and have a fluid under pressure introduced into the hollow element 208L to cause the subassembly to assume a rounded shape whereby the additional layers could be then disposed thereon in a manner previously set forth to complete the hose construction 20L of this invention.

Alternately, it is believed that the completed hose construction 20L could be flattened to a certain degree, be coiled and then subsequently be uncoiled and be expanded into the circular cross-sectional shape thereof by introducing a fluid under pressure into the hollow element 208L.

Of course, the hose construction 20L could be formed of two helically disposed continuous hollow tubes, one being relatively rigid and the other being relatively collapsible, if desired.

While the inner tubes of the hose constructions of this invention have been each previously described as being a continuous one-piece tubular member, it is to be understood that the same could be formed from a plurality of sections joined together or formed as a single strip that is helically disposed, all in a manner well known in the art.

In addition, such separate sections or single helical section that form the inner tube could also be provided with integral rib which will form the relatively rigid rib previously set forth.

Figure 30:
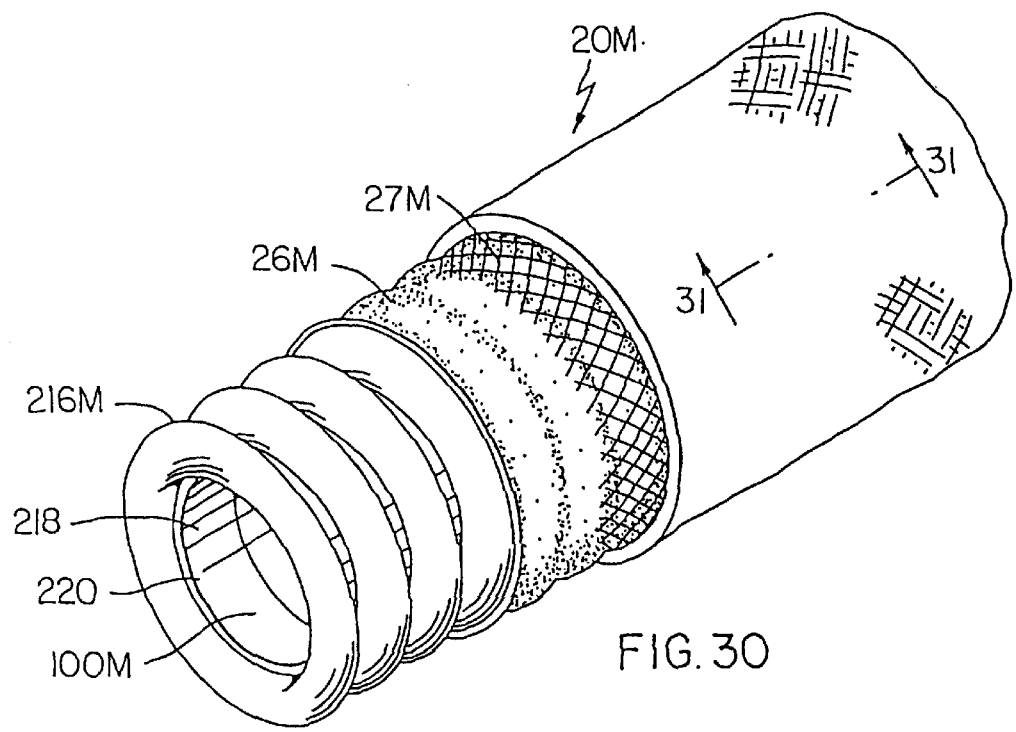
FIG. 30 is a view similar to FIG. 1 and illustrates another new hose construction of this invention, FIG. 30 illustrating certain parts of the hose construction broken away.
Figure 31:
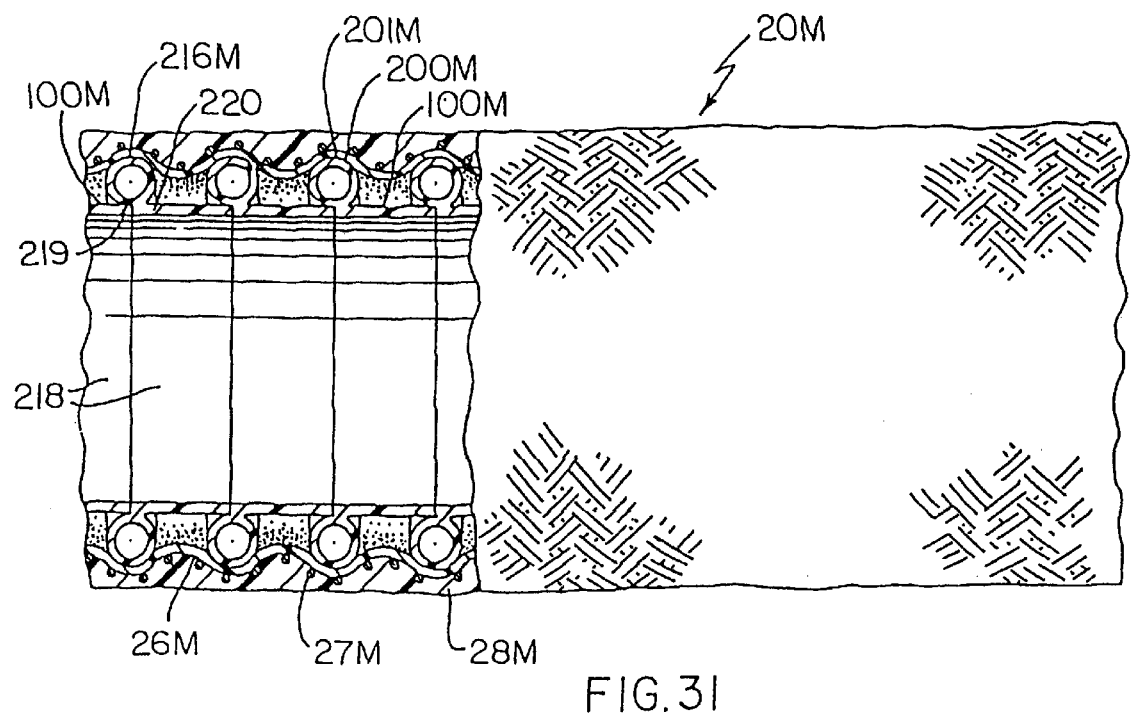
FIG. 31 is an enlarged fragmentary cross-sectional view taken on line 31—31 of FIG. 30.

For example, another hose construction of this invention is generally indicated by the reference numeral 20M in FIGS. 30 and 31 and parts thereof similar to the hose constructions previously described are indicated by like reference numerals followed by the reference letter "M".

As illustrated in FIGS. 30 and 31, it can be seen that the inner tube 100M of the hose construction 20M is formed of a plurality of like annular sections 218 of polymeric material each having one end 219 thereof overlapped by the other end 220 of the next adjacent section 218 in the manner illustrated in FIG. 31 with the end 220 of each section 218 including an annular hollow member 216M which comprises a coil 201M of rib 200M for the resulting hose construction 20M, such overlapping ends 219 and 220 of the sections 218 being secured together in any suitable manner and thereby form the inner tube 100M of the hose construction 20M.

Figure 32:
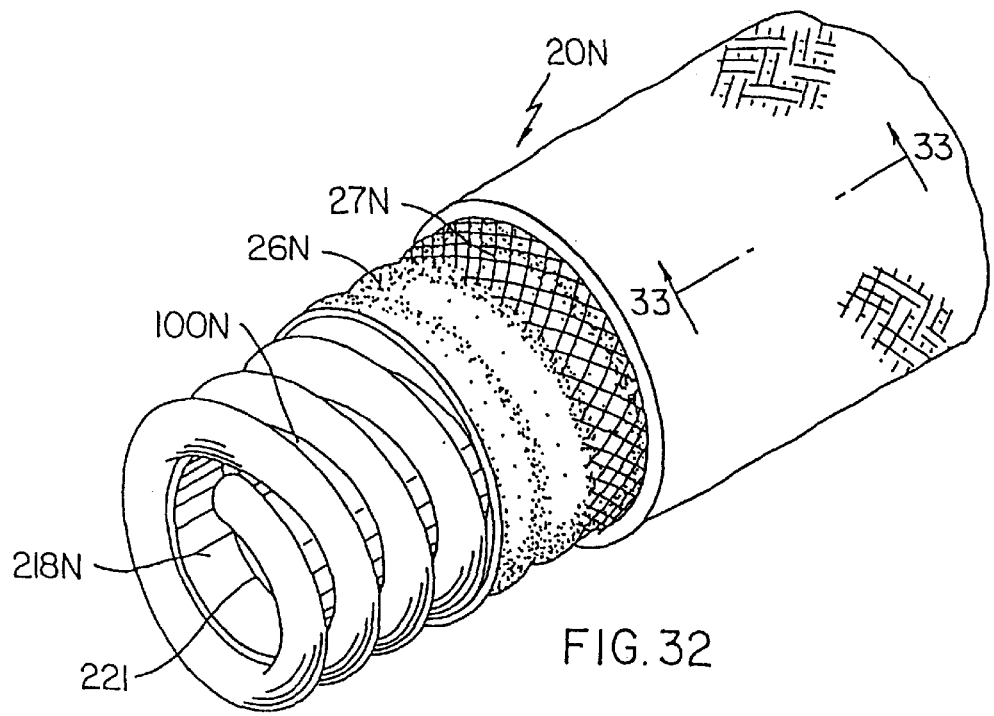
FIG. 32 is a view similar to FIG. 30 and illustrates another hose construction of this invention.
Figure 33:
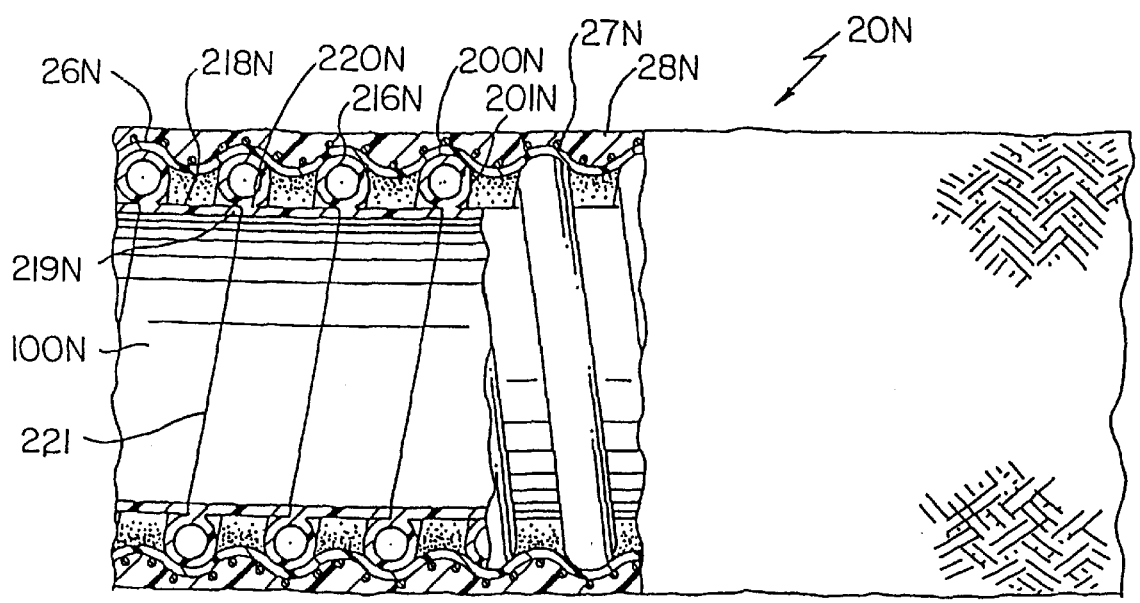
FIG. 33 is an enlarged fragmentary cross-sectional view taken on line 33—33 of FIG. 32.

The hose construction 20N of this invention that is illustrated in FIGS. 32 and 33 is formed by a single strip 218N of polymeric material being wound in a helical manner to define a helical seam 221 where the ends 219N and 220N overlap and are secured together in any suitable manner as illustrated so that the element 216N is helically disposed about the longitudinal axis of the resulting tube 100N and comprises the coil 201N of rib 200N for the purpose previously set forth.

As previously stated, it is believed that the various hose constructions of this invention can have leak detector for detecting any tendency of the liquid being conveyed therethrough from permeating through the hose construction to the exterior thereof and it is believed that such leak detection device can detect such leakage before the leakage reaches the outer cover of the hose construction.

For example, reference is made to FIGS. 20 and 21 wherein the helically wound-continuous hollow element 209H has the passage 211H extending therethrough and such passage 211H can be interconnected to a leak detection device 250 by any suitable interconnection means 251 so that should the liquid being conveyed through the inner tube 100H permeate through the tube 100H and through the thin wall tube 209H, such leak detection 250 can sound an alarm, etc., to indicate that leakage is occurring in the hose construction 20H before such leakage reaches the outer cover means 28H thereof.

It is believed that such leak detection 250 of FIG. 21 can comprise a pressure transducer, be a gas analyzing sampler, etc., and can also be utilized as a quality control leak test for the hose construction 20H prior to the installation thereof in a fuel delivery system utilizing the leak detection 250, if desired.

Alternately, it is believed that the helical coil 209H of the hose construction 20H could be formed of a plastic material which is adapted to change color when exposed to the particular liquid being conveyed by the hose construction 20H and permeating through the inner tube 100H thereof. For example, such plastic material could change color when exposed to hydrocarbons, such as would be present in a fuel delivery hose, and such change of color could be detected by fiber optic disposed in the hose construction 20H.

Also, it is believed that the helically disposed member 209H of the hose construction 20H could comprise a fiber optic cable material which could be utilized to detect the presence of leakage of liquid through the inner tube 100H and thereby would trigger the leak detection device 250 through the interconnection device 251 as it is believed that the fiber optic cable will change the amount of light transmission in the presence of such leakage.

Also, it is believed that the helically wound member 209H could be a conductive member, such as being formed of a conductive polymeric material, which in turn would form part of an electrically operated leak detection device which would have the leaking liquid interconnect the conductive member 209H to another conductive member of the hose construction 20H through the conductive path provided by the leaking liquid that would permeate through the inner hose 100H to the area between the inner hose 200H and the outer tubular member 26H whereby such electrical connection would be sensed by the leak detection device 250 through the interconnection means 251.

If desired, it is believed that the other member of the electrical sensing device could comprise a wire also helically wound in the hose construction 20H between the tubes 100H and 26H. Alternately, the outer cover 28H could be a conductive polymeric material which would complete the circuit. Of course, two electrical wires could be helically wound on the inner tube 100H in spaced relation relative to each other for the leak detection purposes, if desired. Alternately, an electrical conductor could be disposed in a sheath which dissolves in the presence of the fuel or other liquid that would leak through the inner tube 100H to trigger the leak detection means 250, if desired.

Therefore, while the leak detection device previously set forth have each been described in connection with the hose construction 20H of FIGS. 20–21, it is to be understood that each such leak detection device could be utilized with any of the other hose constructions of this invention in a like manner or an obviously changed manner depending on the particular structure of the hose construction of this invention.

In any event, it can be seen that each hose construction of this invention can have leak detection device forming a part thereof which would tend to indicate a leaking problem before the leakage of the liquid normally conveyed by the hose construction reaches the outer cover structure thereof so that action could be taken to prevent an accidental leakage of the liquid to the exterior of the hose construction of this invention.

It is to be understood that the leak detection device previously described that utilizes a conductive polymeric material extends from one end of the hose construction to the other end thereof and, therefore, could also be used as a means for dissipating static electricity from one end of the hose construction to the other end thereof or from one area thereof to another area thereof, as desired, in a manner and for the reasons well known in the antistatic art. Of course, such conductive member could also be used for transmitting electrical current for other purposes, as desired.

Thus, it can be seen that this invention provides a new flexible hose construction and a new method of making such a flexible hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a flexible hose construction comprising an elongated inner tube made of a flexible material and comprising a fluid-resistant layer, an elongated outer tube closely encircling said inner tube and made of a flexible material, and at least one rib extending between said inner and outer tubes; the improvement wherein said at least one rib is comprised of a flexible material, and said at least one rib is disposed between said inner and outer tubes and is bonded to only one of said inner and said outer tube.

2. The hose construction of claim 1 wherein said at least one rib is a plurality of ribs.

3. The hose construction of claim 1 wherein said at least one rib is in the form of a helical strip.

4. The hose construction of claim 1 wherein a continuous path is formed between said at least one rib and said outer tube for conducting fluids therethrough.

5. The hose construction of claim 1 wherein said at least one rib is an annular member spaced longitudinally along said inner and outer tubes.

* * * * *